US009888384B2

(12) United States Patent
Weksler et al.

(10) Patent No.: US 9,888,384 B2
(45) Date of Patent: *Feb. 6, 2018

(54) SECURING A WIRELESS MESH NETWORK VIA A CHAIN OF TRUST

(71) Applicant: GOOGLE INC., Mountain View, CA (US)

(72) Inventors: Michel Weksler, El Cerrito, CA (US); Yassir Abousselham, Walnut Creek, CA (US); Ken Krieger, Jackson, WY (US); Brian De Vries, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/280,655

(22) Filed: Sep. 29, 2016

(65) Prior Publication Data

US 2017/0019788 A1  Jan. 19, 2017

Related U.S. Application Data

(63) Continuation of application No. 14/620,152, filed on Feb. 11, 2015, now Pat. No. 9,485,243.
(Continued)

(51) Int. Cl.
*H04W 84/18* (2009.01)
*H04W 12/06* (2009.01)
(Continued)

(52) U.S. Cl.
CPC ............. *H04W 12/06* (2013.01); *H04L 63/08* (2013.01); *H04L 63/0876* (2013.01);
(Continued)

(58) Field of Classification Search
CPC ..... H04W 84/18; H04W 12/06; H04W 4/008; H04W 84/20
See application file for complete search history.

(56) References Cited

U.S. PATENT DOCUMENTS 6,414,955 B1 * 7/2002 Clare ...................... H04L 41/12
370/390
6,961,541 B2   11/2005 Overy et al.
(Continued)

FOREIGN PATENT DOCUMENTS

CN      1783810 A     6/2006
CN    101099134 A     1/2008
(Continued)

OTHER PUBLICATIONS

Nabil Ali Alrajeh, S. Khan, and Bilal Shams, "Intrusion Detection Systems in Wireless Sensor Networkd: A Review," International Journal of Distributed Sensor Networks, vol. 2013, Article ID 167575, 7 pages, 2013. doi:10.1155/2013/167575.*
(Continued)

*Primary Examiner* — Alexander Lagor
(74) *Attorney, Agent, or Firm* — Johnson, Marcou & Isaacs, LLC

(57) ABSTRACT

A master beacon device emits a data packet that is received and retransmitted by servant beacon devices in a wireless mesh network that enables the beacon devices to detect the received signal strength indicator ("RSSI") of beacon devices in proximity. Each servant beacon device transmits survey data packets comprising the RSSIs and hardware identifiers of proximate beacon devices to the master beacon device, which constructs a first virtual map of the mesh network. At a later time, each servant beacon device transmits authentication data packets, which are retransmitted, each retransmitting beacon inserting an RSSI and hardware identifier of the beacon device from which the authentication
(Continued)

data packet was received, until they reach the master beacon device, which constructs a second virtual map of the mesh network. The master beacon device compares the first virtual map to the second virtual map to determine if the network is secure.

20 Claims, 11 Drawing Sheets

Related U.S. Application Data

(60) Provisional application No. 62/002,754, filed on May 23, 2014.

(51) Int. Cl.
| | |
|---|---|
| *H04L 29/06* | (2006.01) |
| *H04L 29/08* | (2006.01) |
| *H04W 12/12* | (2009.01) |
| *H04W 4/00* | (2009.01) |
| *H04W 84/12* | (2009.01) |

(52) U.S. Cl.
CPC .......... *H04L 63/1433* (2013.01); *H04L 63/20* (2013.01); *H04L 67/12* (2013.01); *H04W 4/008* (2013.01); *H04W 12/12* (2013.01); *H04W 84/12* (2013.01); *H04W 84/18* (2013.01)

(56) References Cited

U.S. PATENT DOCUMENTS

| | | | |
|---|---|---|---|
| 7,228,142 B2 | 6/2007 | Natori et al. | |
| 8,320,562 B2 | 11/2012 | Hammond et al. | |
| 8,750,267 B2 | 6/2014 | Aggarwal et al. | |
| 8,805,403 B2 | 8/2014 | Curticapean et al. | |
| 8,836,489 B2 | 9/2014 | Christensen et al. | |
| 9,485,243 B2 | 11/2016 | Weksler et al. | |
| 9,621,579 B2 | 4/2017 | Casaburi et al. | |
| 2003/0220765 A1 | 11/2003 | Overy et al. | |
| 2003/0232598 A1 | 12/2003 | Aljadeff et al. | |
| 2004/0264388 A1 | 12/2004 | Rover et al. | |
| 2006/0068811 A1 | 3/2006 | Adya et al. | |
| 2007/0298720 A1 | 12/2007 | Wolman et al. | |
| 2008/0070563 A1 | 3/2008 | Adya et al. | |
| 2009/0085769 A1* | 4/2009 | Thubert .................. | H04L 45/04 340/870.07 |
| 2009/0175238 A1* | 7/2009 | Jetcheva ............. | H04W 72/085 370/329 |
| 2010/0115272 A1* | 5/2010 | Batta ........................ | H04L 45/00 713/162 |
| 2010/0172259 A1 | 7/2010 | Aggarwal et al. | |
| 2013/0010617 A1 | 1/2013 | Chen et al. | |
| 2013/0252587 A1 | 9/2013 | Ko et al. | |
| 2013/0273938 A1* | 10/2013 | Ng ......................... | H04W 64/00 455/456.1 |
| 2014/0030982 A1 | 1/2014 | Cardona | |
| 2015/0004974 A1 | 1/2015 | Karimi-Cherkandi et al. | |
| 2015/0172991 A1* | 6/2015 | Petersen ............... | H04W 40/12 370/252 |
| 2015/0223145 A1 | 8/2015 | Yoon et al. | |
| 2015/0332248 A1 | 11/2015 | Weksler et al. | |
| 2016/0006848 A1* | 1/2016 | Halvarsson ......... | H04L 67/1095 455/414.1 |
| 2016/0019512 A1 | 1/2016 | Buchheim et al. | |

FOREIGN PATENT DOCUMENTS

| | | |
|---|---|---|
| CN | 102273174 A | 12/2011 |
| JP | 2006-526940 A | 11/2006 |
| JP | 2010-273205 A | 12/2010 |
| JP | 2011-229061 A | 11/2011 |
| JP | 2012-175518 A | 9/2012 |
| WO | 2006/093634 A1 | 9/2006 |
| WO | 2008/059882 A1 | 5/2008 |
| WO | 2010/078578 A2 | 7/2010 |
| WO | 2010/133634 A1 | 11/2010 |
| WO | 2015/175222 A1 | 11/2015 |
| WO | 2015/179090 A1 | 11/2015 |

OTHER PUBLICATIONS

I. F. Akyildiz and Xudong Wang, "A survey on wireless mesh networks," in IEEE Communications Magazine, vol. 43, No. 9, pp. S23-S30, Sep. 2005.*
Akyildiz, et al., "A Survey on Wireless Mesh Networks", IEEE Communications Magazine, vol. 43, No. 9, Sep. 2005, 8 pages.
Alrajeh, et al., "Intrusion Detection Systems in Wireless Sensor Networks: A Review", International Journal of Distributed Sensor Networks, vol. 2013, Article ID 167575, 7 pages.
Bai, "International Preliminary Report on Patentability issued in International Application No. PCT/US2015/028304", dated Nov. 24, 2016, 13 pages.
Barrio Baranano, "International Search Report and Written Opinion issued in International Application No. PCT/US2015/028304", dated Jul. 13, 2015, 17 pages.
Demirbas, et al., "An RSSI-based Scheme for Sybil Attack Detection in Wireless Sensor Networks", Proceedings of the 2006 International Symposium on a Worl of Wireless, Mobile and Multimedia Networks, XP010925920, Jun. 26, 2006, 5 pages.
Han, et al., "A Timing-Based Scheme for Rogue AP Detection", IEEE Transactions on Parallel and Distributed Systems, vol. 22, No. 11, Nov. 1, 2011, pp. 1912-1925.
Koestel, "International Search Report and Written Opinion issued in International Application No. PCT/US2015/028298", dated Apr. 9, 2015, 12 pages.
Moon, "International Preliminary Report on Patentability issued in International Application No. PCT/US2015/028298", dated Dec. 8, 2016, 9 pages.
"Chinese Office Action issued in Chinese Application No. 201580035244.6", dated Jun. 22, 2017, 5 pages of English Translation and 5 pages of Chinese Office Action.
Maloney, "Australian Office Action issued in Australian Application No. 2015259667", dated Jul.13, 2017, 7 pages.
Taebeom, et al., "Online Detection of Fake Access Points using Received Signal Strengths", IEEE 75th Vehicular Technology Conference, May 6-9, 2012, 5 pages.
Lee, "Korean Office Action issued in Korean Application No. 10-2016-7034780", dated Aug. 9, 2017, 3 pages of English Translation and 3 pages of Korean Office Action.
Siddiqui, "Canada Office Action received for Canada Patent Application No. 2,949,052", dated May 2, 2017, 4 pages.
Kuji, "Japanese Office Action issued in Japanese Application No. 2016-576085", dated Jun. 12, 2017, 2 pages of English Translation and 2 pages of Japanese Office Action.
Haoka, "Japanese Office Action issued in Japanese Application No. 2016-567723", dated Nov. 13, 2017, 6 pages of English Translation and 5 pages of Korean Office Action.

\* cited by examiner

SECURING A WIRELESS MESH NETWORK VIA A CHAIN OF TRUST

RELATED APPLICATIONS

This application is a continuation of U.S. patent application Ser. No. 14/620,152, filed Feb. 11, 2015 and entitled "Securing a Wireless Mesh Network Via A Chain of Trust," which claims priority to U.S. Patent Application No. 62/002,754, filed May 23, 2014 and entitled "Securing a Wireless Mesh Network Via a Chain of Trust." The entire contents of the above-identified applications are hereby fully incorporated herein by reference.

TECHNICAL FIELD

The present disclosure relates generally to wireless mesh network connections, and more particularly to securing wireless mesh network connections.

BACKGROUND

Beacon devices, such as Bluetooth low energy beacons or Wi-Fi beacons, are inexpensive devices that a merchant system can install in a merchant location. Beacon devices may communicate advertising ("ADV") packets to user computing devices, such as smartphones and tablets that are within signal range. Beacon devices may be placed by a merchant near a point of sale ("POS") terminal. Establishing a network connection with a beacon device may indicate to a user computing device that it is near a merchant POS terminal. A user computing device may be configured to allow a transaction resulting in the transfer of user financial account information when it is near a POS terminal. Additionally, a merchant system may have arranged therein multiple beacon devices in a merchant location that communicate with each other in a mesh network and with user computing devices in network proximity.

It is important that network connections between beacon devices and user computing devices is secure. A third party may move a beacon device so that the user computing device allows a transaction, determining that it is near the POS terminal when it actually is not. Additionally, user financial account information may be compromised by a third party moving a beacon device and replacing it with a third party device that intercepts and retransmits communications between the beacon device and the user computing device.

Accordingly, a need exists for secure network communications. Conventional technologies do not determine the security of a wireless mesh network of beacon devices by periodically creating and comparing virtual maps comprising received signal strength indicator ("RSSI") values, path loss indicator values, or other distance sensitive values detected by each beacon device in the mesh network of beacon devices in proximity.

SUMMARY

In certain example aspects described herein, a computer-implemented method to determine the security of a wireless mesh network of beacon devices is provided. In an example embodiment, a merchant system arranges beacon devices in a mesh network. A master beacon device emits a data packet that is received and retransmitted by servant beacon devices that enables beacon devices in a wireless mesh network to detect the received signal strength indicator ("RSSI") of beacon devices in proximity. Each servant beacon device transmits survey data packets to the master beacon device comprising the RSSIs and hardware identifiers of proximate beacon devices from which the master beacon device constructs a first virtual map of the relative positions of each beacon device in the wireless mesh. At a later time, each servant beacon device transmits authentication data packets, which are retransmitted by the other beacon devices in the mesh network until they reach the master beacon device. As each authentication data packet is retransmitted, each retransmitting beacon inserts an RSSI and hardware identifier of the beacon device from which the authentication data packet was received. The master beacon constructs a second virtual map of the mesh network based on data received in the authentication data packets. The master beacon device compares the first virtual map to the second virtual map to determine if the network is secure.

In certain other example aspects described herein, a system and a computer program product to determine the security of a wireless mesh network of beacon devices are provided.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
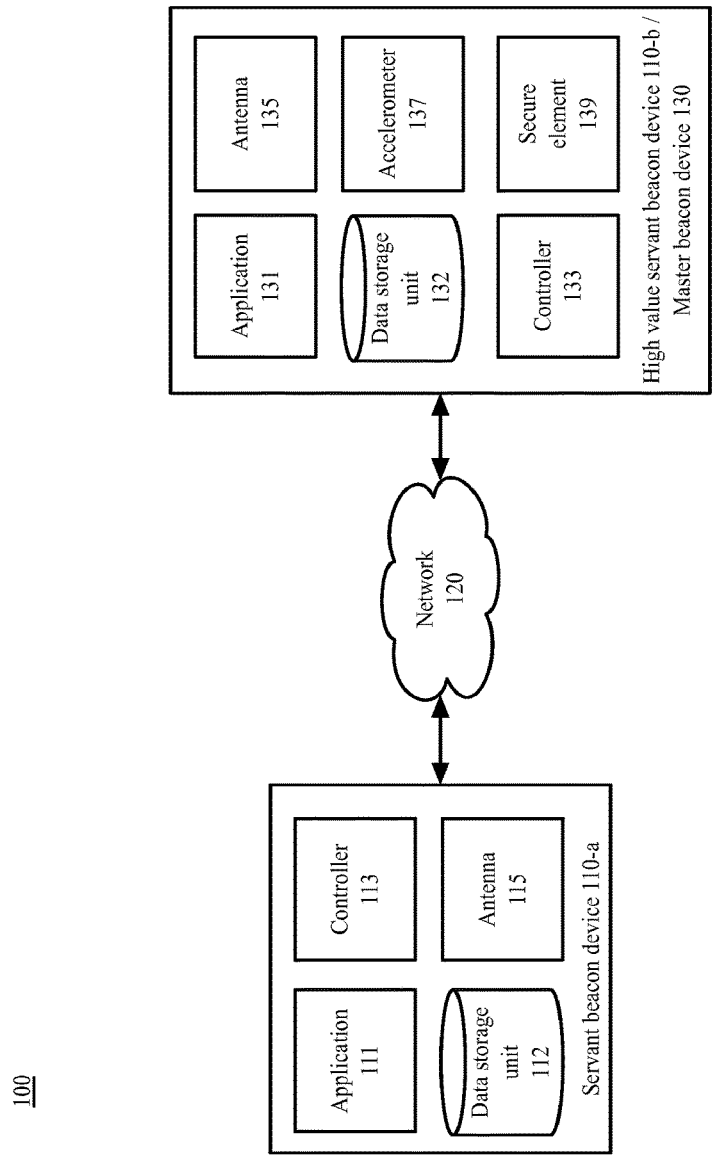
FIG. 1 is a block diagram depicting a system for determining the security of a wireless mesh network of beacon devices, in accordance with certain example embodiments.

The example embodiments described herein provide computer-implemented techniques for determining the security of a wireless mesh network of beacon devices. In an example embodiment, beacon devices are arranged in a mesh network. A master beacon device emits a data packet that is received and retransmitted by servant beacon devices that enables beacon devices in a wireless mesh network to detect the received signal strength indicator ("RSSI") of proximate beacon devices. Each servant beacon device transmits survey data packets to the master beacon device comprising the RSSIs and hardware identifiers of proximate beacon devices from which the master beacon device constructs a first virtual map of the relative positions of each beacon device in the wireless mesh. At a later time, each servant beacon device transmits authentication data packets, which are retransmitted by the other beacon devices in the mesh network until they reach the master beacon device. As each authentication data packet is retransmitted, each retransmitting beacon inserts an RSSI and hardware identifier of the beacon device from which the authentication data packet was received. The master beacon constructs a second virtual map of the mesh network based on data received in the authentication data packets. The master beacon device compares the first virtual map to the second virtual map to determine if the network is secure.

A mesh network of beacon devices is arranged. At least four beacon devices in the mesh network are high value beacon devices comprising an accelerometer and encryption capabilities while the rest of the beacon devices do not comprise these special features. One of the high value beacon devices is designated as the master beacon device. The rest of the beacon devices, including the other three high value beacon devices, are servant beacon devices. The master beacon device emits an availability data packet, which is received and retransmitted by all servant beacon devices in the mesh network, each beacon device recording, for each availability data packet received, the hardware identifier and received signal strength indicator ("RSSI") of the beacon device which sent the availability data packet. In other example embodiments, the received channel power indicator ("RCPI"), the time of arrival ("TOA"), the round trip time ("RTT"), or the free space path loss is determined instead of the RSSI. Each beacon device extracts the three strongest RSSI values recorded and the corresponding hardware identifiers of the respective beacon devices associated with the RSSI values and transmits this information in a survey data packet to the master beacon device. The master beacon device constructs a first virtual map of the mesh network based on the information received in the survey data packets.

The master beacon device emits an enrollment data packet for each beacon device in the mesh network, the enrollment data packet comprising a destination hardware identifier of a destination servant beacon device. The enrollment data packets are transmitted and retransmitted by the beacon devices in the mesh network until they reach the appropriate destination beacon devices. Each servant beacon device then transmits authentication data packets destined for the master beacon device comprising a hardware identifier of the sending beacon device. High value servant beacon devices transmit authentication data packets that further comprise data from an accelerometer that detects physical movement of the beacon device and an encrypted signature. The authentication data packets are transmitted and retransmitted by the servant beacon devices in the mesh network until they reach the master beacon device. When a servant beacon device receives an authentication data packet, it adds the detected RSSI and hardware identifier of the beacon device which sent the authentication data packet before retransmitting the authentication data packet. An authentication data packet may be retransmitted multiple times via multiple servant beacon devices before reaching the master beacon device.

Receiving the authentication data packets, the master beacon device constructs a second virtual map of the mesh network based on the information received in the authentication data packets. The master beacon device compares the second virtual map against the first virtual map. If any significant differences exist between the RSSI values in the virtual maps, the master beacon device determines that the mesh network is insecure. Additionally, the master beacon device determines, based on accelerometer data and digital signatures received in the authentication data packets originating from high value servant beacon devices, that the network is insecure if any of the high value servant beacon devices have moved or if the digital signatures are invalid. Upon determining that the mesh network is insecure, the master beacon device may alert an appropriate entity or disable the network. If significant differences do not exist between the RSSI values in the virtual maps, none of the high value beacon devices have moved, and the digital signatures received from high value servant beacon devices are valid, the master beacon device determines that the network is secure. In an example embodiment, a user computing device may conduct a transaction with a merchant system associated with the wireless mesh network of beacon devices after receiving a notification that the network is secure. The master beacon may periodically repeat this method to determine the security the mesh network.

Example System Architecture

Turning now to the drawings, in which like numerals indicate like (but not necessarily identical) elements throughout the figures, example embodiments are described in detail.

FIG. 1 is a block diagram depicting a system 100 for determining the security of a wireless mesh network of beacon devices, in accordance with certain example embodiments. As depicted in FIG. 1, the system 100 includes network computing devices 110-*a*, 110-*b*, and 130 that are configured to communicate with one another via one or more networks 120. In an example embodiment, a wireless mesh network comprises one or more high value servant beacon devices 110-*b*, one or more (non-high value) servant beacon devices 110-*a*, and a master beacon device 130 that are configured to communicate with one another via one or more networks 120. In some embodiments, a user associated with a device must install an application and/or make a feature selection to obtain the benefits of the techniques described herein.

The network 120 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, NFC, or any combination thereof or any other appropriate architecture or system that facilitates the communication of signals, data, and/or messages and allows for the measurement of a received signal strength indicator ("RSSI") or similar property. Throughout the discussion of example embodiments, it should be understood that the terms "data" and "information" are used interchangeably herein to refer to text, images, audio, video, or any other form of information that can exist in a computer-based environment.

Each network computing device 110-a, 110-b, and 130 includes a device having a communication module capable of transmitting and receiving data over the network 120. For example, each network computing device 110-a, 110-b, and 130 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110-a, 110-b, and 130 are operated by merchant system operators. For example, the merchant system is associated with the one or more network computing devices 110-a, 110-b, and 130.

An example servant beacon device 110-a comprises an application 111, a data storage unit 112, a controller 113, and an antenna 115. In an example embodiment, a user interface (not shown) enables a merchant operator to interact with the application 131. For example, a merchant system operator may install and/or configure the servant beacon device 110-a.

In an example embodiment, the data storage unit 112 comprises a local or remote data storage structure accessible to the servant beacon device 110-a suitable for storing information. In an example embodiment, the data storage unit 112 stores encrypted information, such as HTML5 local storage. In an example embodiment, the data storage unit 112 stores the detected received signal strength indicator ("RSSI") values of beacon devices from which an availability data packet or survey data packet is received. In this example embodiment, the data storage unit 112 stores any data received in the availability data packets and/or survey data packets. In another example embodiment, the data storage unit 112 stores the RSSI values and hardware identifiers of proximate beacon devices that are received in an enrollment data packet. In an example embodiment, the application 111 may access the data storage unit 112 to retrieve stored data.

In an example embodiment, the application 111 is a program, function, routine, applet, or similar entity that exists on and performs its operations on the servant beacon device 110-a. In certain embodiments, a merchant operator must install the application 111 and/or make a feature selection on the servant beacon device 110-a to obtain the benefits of the techniques described herein. In an example embodiment, the merchant operator may access the application 111 on the servant beacon device 110-a via a user interface (not shown). In an example embodiment, the application 111 may transmit and receive probing requests via the controller 113 through the antenna 115 to determine if network 120 devices are present within proximity with which the servant beacon device 110-a may establish network 120 connections. In an example embodiment, the application 111 receives a request from one or more other servant beacon devices 110-a, one or more high value servant beacon devices 110-b, and/or the master beacon device 130 to establish one or more network 120 connections between the servant beacon device 110-a and the one or more requesting network 120 beacon devices. In an example embodiment, the merchant operator configures the settings of the application 111 and/or the servant beacon device 110-a to allow the application 111 to automatically establish a network connection with one or more requesting network 120 beacon devices. In an example embodiment, the application 111 communicates with the controller 113 to establish one or more network 120 connections with one or more other servant beacon devices 110-a, one or more high value servant beacon devices 110-b, and/or the master beacon device 130 via a radio frequency ("RF") antenna 115. In another example embodiment, the servant beacon device 110-a transmits a request to one or more other servant beacon devices 110-a, one or more high value servant beacon devices 110-b, and/or the master beacon device 130 to establish one or more network 120 connections with the one or more requested network 120 beacon devices. In this example embodiment, the one or more requested network 120 beacon devices accept the request to establish a network 120 connection with the requesting servant beacon device 110-a.

In an example embodiment, the application 111 receives an availability data packet directly from the master beacon device 130 or from the master beacon device 130 via one or more retransmitting servant beacon devices 110. In an example embodiment, the application 111 determines the hardware identifier and a detected RSSI value of one or more sending beacon devices from which it receives an availability data packet and communicates with the data storage unit 112 to store this information. For example, the application 111 may extract the hardware identifier from a data packet received from the sending beacon device or may transmit a request to the sending beacon device for its hardware identifier and receive the hardware identifier in a response. In an example embodiment, the application 111 transmits a survey data packet comprising a list of RSSI values and corresponding hardware identifiers associated with beacon devices in proximity to the servant beacon device 110-a on which the application 111 resides. In this example embodiment, the application 111 may communicate with the data storage unit 112 to extract the stored RSSI values and corresponding hardware identifiers to create the survey data packet. In an example embodiment, the application 111 receives an enrollment data packet directly from the master beacon device 130 or from the master beacon device 130 via one or more retransmitting servant beacon devices 110. In this example embodiment, the enrollment data packet comprises a list of proximate beacon devices and a baseline RSSI value between the servant beacon device 110-b and each of the listed proximate beacon devices. For example, the list of proximate beacon devices may comprise a list of at least three beacon device hardware identifiers and three corresponding RSSI values. In an example embodiment, the application 111 transmits an authentication data packet comprising the hardware identifier of the servant beacon device 110-a on which the application 111 resides. In this example embodiment, the authentication data packet is transmitted to the master beacon device 130 via one or more of the proximate beacon devices in the list of proximate beacon devices received in the enrollment data packet. In this example embodiment, the application 111 receives the authentication data packets of other servant beacon devices 110, detects an RSSI value for the sending beacon device and determines the corresponding hardware identifier of the sending beacon device, inserts the RSSI value and corresponding hardware identifier into the received authentication data packet, and retransmits the authentication data packet.

In an example embodiment, the controller 113 communicates with the application 111 and is capable of sending and receiving data over the network 120. In an example embodiment, the controller 113 activates the RF antenna 115 to create one or more network 120 connections between the servant beacon device 110-a and one or more other servant beacon devices 110-a, one or more high value servant beacon devices 110-b, and/or the master beacon device 130. In an example embodiment, the controller 113 is a Bluetooth low energy link controller, a Bluetooth link controller, a Wi-Fi controller, or any other wireless network 120 controller suitable to perform the methods described herein. In an example embodiment, the controller 113 polls through the antenna 115 a radio signal, or listens for radio signals from one or more other servant beacon devices 110-a, one or more high value servant beacon devices 110-b, and/or the master beacon device 130.

In an example embodiment, the servant beacon device 110-a communicates with one or more other servant beacon devices 110-a, one or more high value servant beacon devices 110-b, and/or the master beacon device 130 via the antenna 115 over one or more network 120 connections. In an example embodiment, the antenna 115 is a radio frequency ("RF") antenna.

An example high value servant beacon device 110-b comprises an application 131, a data storage unit 132, a controller 133, an antenna 135, and an accelerometer 137. In an example embodiment, a user interface (not shown) enables a merchant operator to interact with the application 131. For example, a merchant system operator may install and/or configure the high value servant beacon device 110-b.

In an example embodiment, the application 131 residing on the high value servant beacon device 110-b is a program, function, routine, applet, or similar entity that exists on and performs its operations on the high value servant beacon device 110-b. In certain embodiments, a merchant operator must install the application 131 and/or make a feature selection on the high value servant beacon device 110-b to obtain the benefits of the techniques described herein. In an example embodiment, the merchant operator may access the application 131 on the high value servant beacon device 110-b via a user interface (not shown). In an example embodiment, the application 131 performs functions similar to the application 111 residing on a servant beacon device 110-a. In an example embodiment, the application 131, in addition to performing functions similar to the application 111, further performs the functions of creating digital signatures to send in authentication data packets. In this example embodiment, the application 131 may communicate with a secure element 139 resident on the high value servant beacon device 110-b to create the digital signature using a cryptographic key residing on the secure element 139. In this example embodiment, digital signatures created by the cryptographic key resident on the secure element 139 may be decrypted by the master beacon device 130. In another example embodiment, the application 131, in addition to performing functions similar to the application 111, further performs the functions of determining if the high value servant beacon device 110-b has moved by communicating with an accelerometer 137 resident on the high value servant beacon device 110-b.

In an example embodiment, the application 131 residing on the master beacon device 130 is a program, function, routine, applet, or similar entity that exists on and performs its operations on the master beacon device 130. In certain embodiments, a merchant operator must install the application 131 and/or make a feature selection on the master beacon device 130 to obtain the benefits of the techniques described herein. In an example embodiment, the merchant operator may access the application 131 on the master beacon device 130 via a user interface (not shown). In an example embodiment, an application 131 resident on a high value beacon device 110-b is configured by the merchant system operator to convert the high value servant beacon device 110-b to be the master beacon device 130 and the application 131 to be a master beacon device 130 application 131. In an example embodiment, the application 131 residing on the master beacon device 130 performs one or more of the functions performed by the application 131 residing on the high value servant beacon device 110-b and/or the application 111 residing on the servant beacon device 110-a. In an example embodiment, the application 131 residing on the master beacon device 130 transmits authentication data packets comprising a hardware identifier of the master beacon device 130. In an example embodiment, the master beacon device 130 application 131 receives one or more survey data packets from one or more servant beacon devices 110 in the mesh network. In this example embodiment, the master beacon device 130 extracts hardware identifiers and RSSI values received in the survey data packets and uses this information to construct a first virtual map of the mesh network of beacon devices. In an example embodiment, the master beacon device 130 application 131 transmits enrollment data packets comprising destination beacon device identifiers corresponding to each of the servant beacon devices 110 in the mesh network and comprising a list of the hardware identifiers and corresponding RSSI values of at least three beacon devices in proximity to the servant beacon device 110 associated with the destination beacon device identifier.

In an example embodiment, the master beacon device 130 application 131 receives authentication data packets comprising detected RSSI values and hardware identifiers from one or more servant beacon devices 110 in the mesh network. In this example embodiment, the master beacon device 130 application 131 constructs a second virtual map of the wireless mesh network of beacon devices based on the data received in the authentication data packets. In an example embodiment, the master beacon device 130 application 131 compares the first virtual map and the second virtual map and determines if any significant differences exist in RSSI values. In this example embodiment, the master beacon device 130 application 131 may also decrypt and verify any digital signatures received in the authentication data packets. In this example embodiment, the master beacon device 130 application may also receive a detection of movement in one or more of the authentication data packets. In an example embodiment, based on comparing the first and second virtual maps, verifying any received digital signatures, and analyzing any received detections of movement in one or more of the authentication data packets, the master beacon device 130 application 131 determines if the wireless mesh network is secure. In an example embodiment, the master beacon device 130 application 131 may terminate one or more network 120 connections within the wireless mesh network upon determining that the wireless mesh network is insecure.

In an example embodiment, the data storage unit 132 comprises a local or remote data storage structure accessible to the high value servant beacon device 110-*b* or the master beacon device 130 suitable for storing information. In an example embodiment, the data storage unit 132 stores encrypted information, such as HTML5 local storage. In an example embodiment, the data storage unit 132 stores the detected received signal strength indicator ("RSSI") values of beacon devices from which an availability data packet or survey data packet is received. In this example embodiment, the data storage unit 132 stores any data received in the availability data packets and/or survey data packets. In another example embodiment, the data storage unit 132 stores the RSSI values and hardware identifiers of proximate beacon devices that are received in enrollment data packets and/or authentication data packets. In an example embodiment, the application 131 may access the data storage unit 132 to retrieve stored data. A master beacon device 130 data storage unit 132 may store one or more virtual maps created by the master beacon device 130 application 131.

In an example embodiment, the controller 133 communicates with the application 131 and is capable of sending and receiving data over the network 120. In an example embodiment, the controller 133 activates the RF antenna 135 to create one or more network 120 connections between the high value servant beacon device 110-*b* or master beacon device 130 on which the controller 133 resides and one or more other beacon devices in the wireless mesh network. In an example embodiment, the controller 133 is a Bluetooth low energy link controller, a Bluetooth link controller, a Wi-Fi controller, or any other wireless network 120 controller suitable to perform the methods described herein. In an example embodiment, the controller 133 polls through the antenna 135 a radio signal, or listens for radio signals from one or more other network 120 beacon devices.

In an example embodiment, the high value servant beacon device 110-*b* communicates with one or more other servant beacon devices 110-*a*, one or more high value servant beacon devices 110-*b*, and/or the master beacon device 130 via the antenna 135 over one or more network 120 connections. In an example embodiment, the master beacon device 130 communicates with one or more servant beacon devices 110-*a* and one or more high value servant beacon devices 110-*b* via the antenna 135 over one or more network 120 connections. In an example embodiment, the antenna 135 is a radio frequency ("RF") antenna.

In an example embodiment, the accelerometer 137 is capable of detecting any movement of the high value servant beacon device 110-*b* and/or master beacon device 130 on which the accelerometer 137 resides. In an example embodiment, the accelerometer 137 detects physical movement of the master beacon device 130 or high value servant beacon device 110-*b* on which it resides and communicates a determination of movement to the application 131 resident on the same device.

In an example embodiment, the secure element 139 on a high value servant beacon device 110-*b* comprises a private key used to create a digital signature sent in an authentication data packet. In this example embodiment the secure element 139 on the master beacon device 130 comprises a cryptographic key with which it decrypts one or more digital signatures received in one or more authentication data packets. In an example embodiment, the application 131 is resident on the secure element 139 of the high value servant beacon device 110-*b* and/or the master beacon device 130.

It will be appreciated that the network connections shown are example and other means of establishing a communications link between the computers and devices can be used. Moreover, those having ordinary skill in the art having the benefit of the present disclosure will appreciate that the servant beacon device 110-*a*, the high value servant beacon device 110-*b*, and the master beacon device 130 illustrated in FIG. 1 can have any of several other suitable computer system configurations. For example, a user computing device 110 embodied as a mobile phone or handheld computer may or may not include all the components described above.

Figure 2:
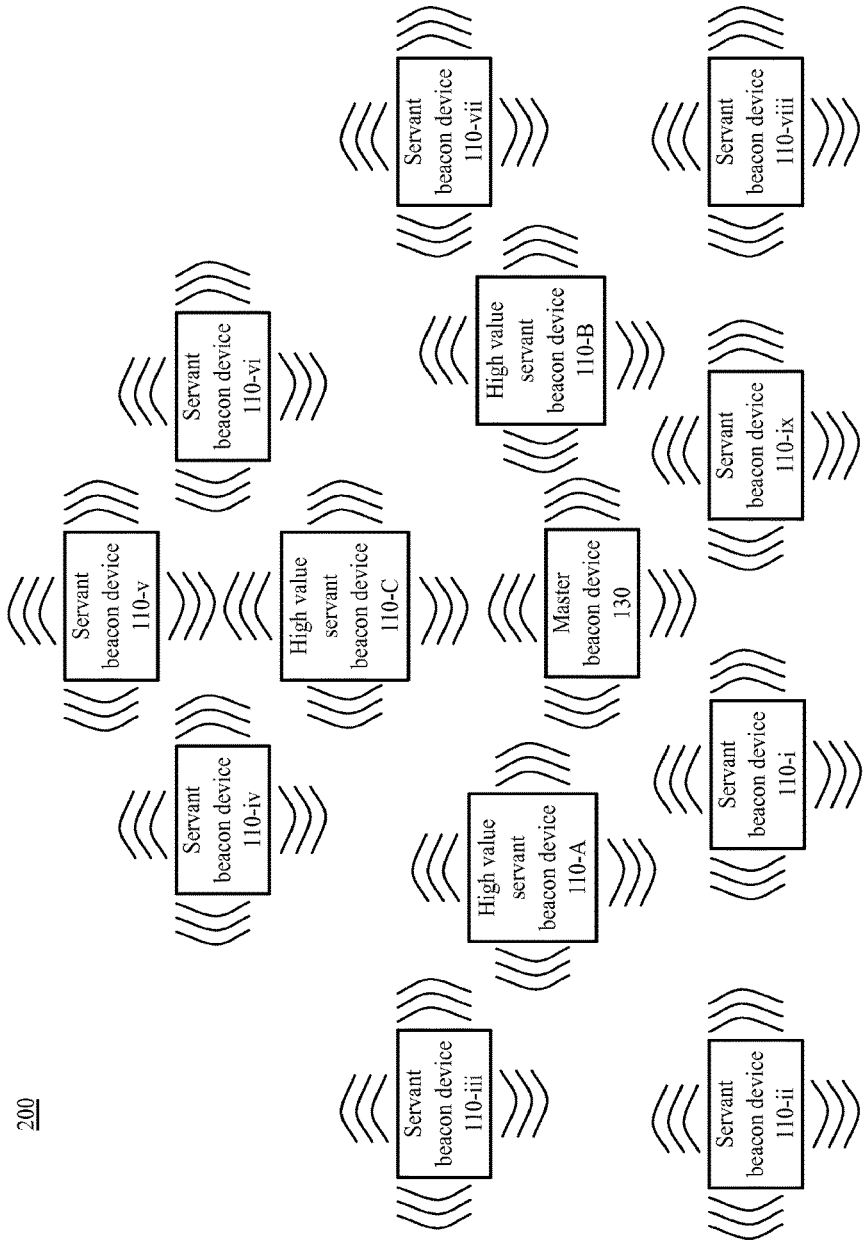
FIG. 2 is a block diagram depicting a wireless mesh network comprising a master beacon, a plurality of high value beacons, and a plurality of servant beacon devices, in accordance with certain example embodiments.

FIG. 2 is a block diagram depicting a system 200 comprising an example wireless mesh network of beacon devices. As depicted in FIG. 2, the system 200 includes a master beacon device 130, three high value servant beacon devices 110-A, 110-B, and 110-C, and nine servant beacon devices 110-*i*, 110-*ii*, 110-*iii*, 110-*iv*, 110-*v*, 110-*vi*, 110-*vii*, 110-*viii*, and 110-*ix* arranged in a physical area that are configured to communicate with one another via one or more networks 120 (not shown). In the example embodiments described herein, each of the servant beacon devices 110-*i*, 110-*ii*, 110-*iii*, 110-*iv*, 110-*v*, 110-*vi*, 110-*vii*, 110-*viii*, and 110-*ix* shown in FIG. 2 comprise the components and perform the functions of the example servant beacon device 110-*a* shown in FIG. 1. In the example embodiments described herein, each of the high value servant beacon devices 110-A, 110-B, and 110-C shown in FIG. 2 comprise the components and perform the functions of the example high value servant beacon device 110-*b* shown in FIG. 1. In the example embodiments described herein, the master beacon device 130 shown in FIG. 2 comprises the components and performs the functions of the example master beacon device 130 shown in FIG. 1. In the example embodiments described herein, each of the beacon devices of the system 200 may or may not be able to communicate with every other beacon device in the wireless mesh network via a wireless network connection. In the example embodiments described herein, each beacon device may communicate with other network beacon devices within a predefined proximity that enables the devices to maintain a network connection. In the example embodiments described herein, the arrangement of the plurality of beacon devices shown in FIG. 2 is example and a merchant system operator may arrange beacon devices in various other arrangements wherein the quantity of servant beacon devices may vary, the quantity of high value servant beacon devices may vary, and/or the arrangement in physical space of the plurality of beacon devices in the wireless mesh network may vary.

Figure 11:
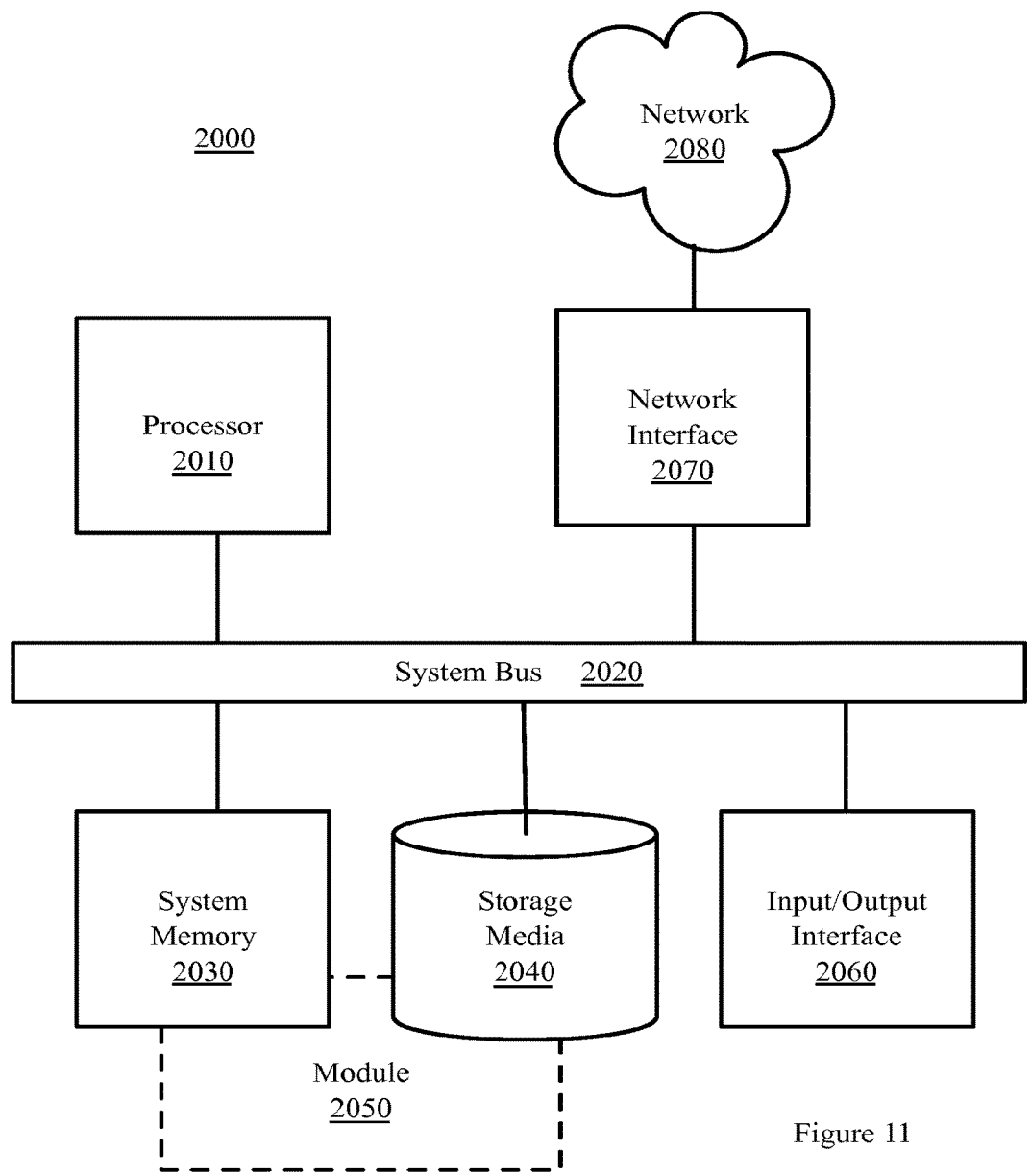
FIG. 11 is a block diagram depicting a computer machine and module, in accordance with certain example embodiments.

In example embodiments, the network computing devices and any other computing machines associated with the technology presented herein may be any type of computing machine such as, but not limited to, those discussed in more detail with respect to FIG. 11. Furthermore, any modules associated with any of these computing machines, such as modules described herein or any other modules (scripts, web content, software, firmware, or hardware) associated with the technology presented herein may by any of the modules discussed in more detail with respect to FIG. 11. The computing machines discussed herein may communicate with one another as well as other computer machines or communication systems over one or more networks, such as network 120. The network 120 may include any type of data or communications network, including any of the network technology discussed with respect to FIG. 11.

Example Processes

The example methods illustrated in FIGS. 3-11 are described hereinafter with respect to the components of the example operating environment 100 and the example system 200 comprising a wireless mesh network of beacon devices. The example methods of FIGS. 3-11 may also be performed with other systems and in other environments.

Figure 3:
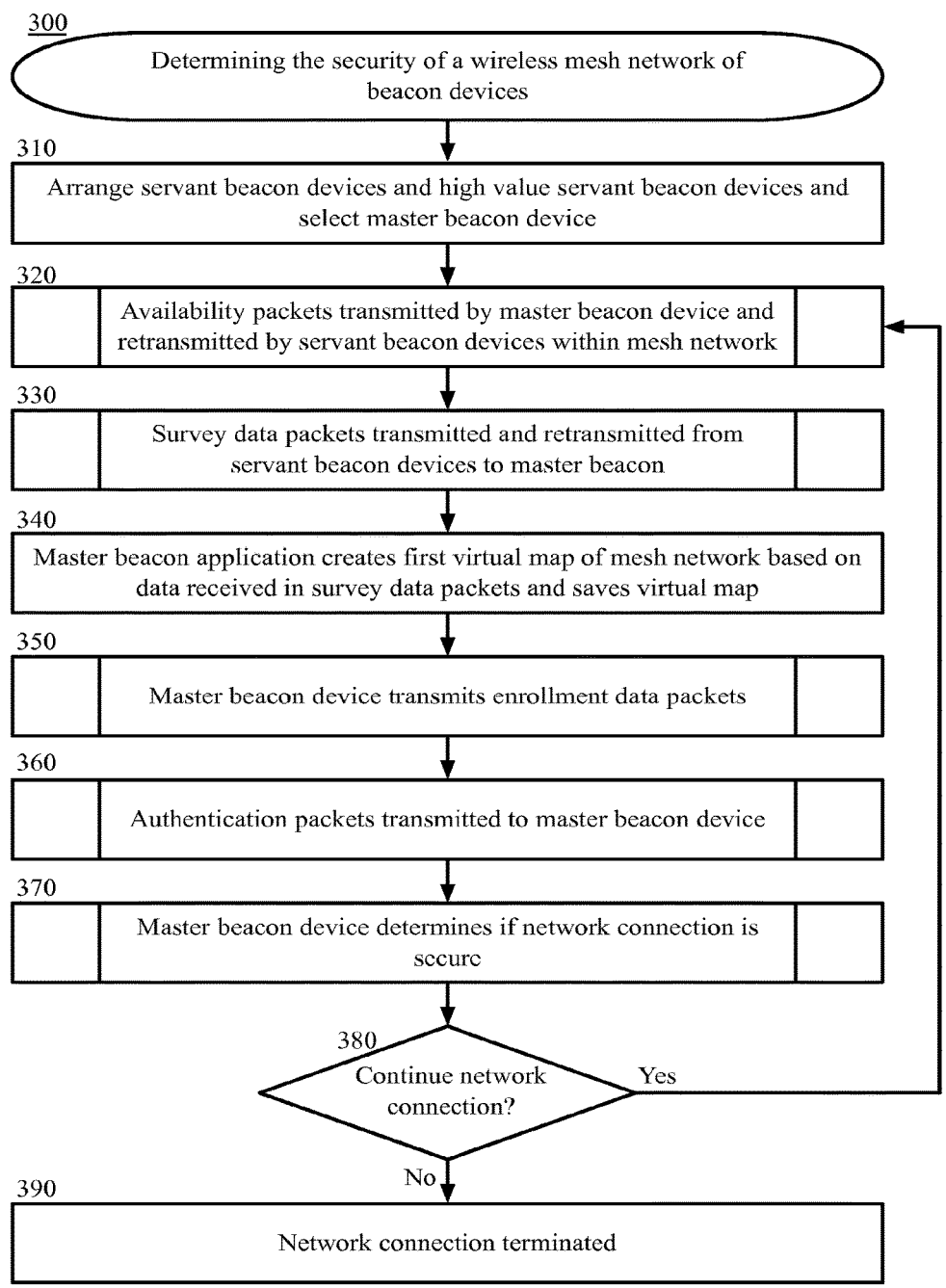
FIG. 3 is a block flow diagram depicting a method for determining the security of a wireless mesh network of beacon devices, in accordance with certain example embodiments.

FIG. 3 is a block diagram depicting a method 300 for determining the security of a wireless mesh network of beacon devices, in accordance with certain example embodiments. The method 300 is described with reference to the components illustrated in FIGS. 1-2.

In block 310, servant beacon devices 110-a and high value beacon devices 110-b are arranged and a master beacon is selected. In an example embodiment, a merchant system (not shown) comprises one or more merchant locations. In an example merchant location, an operator associated with the merchant system arranges one or more servant beacon devices 110-a and one or more high value servant beacon devices 110-b. For example, the merchant location comprises a supermarket and the merchant system operator arranges one or more servant beacon devices 110-a and one or more high value servant beacon devices 110-b throughout the supermarket location. In an example embodiment, the merchant system operator selects a high value servant beacon device 110-b to be the master beacon device 130. In this example embodiment, the merchant system operator may have to configure the master beacon device 130 to perform the functions of an example master beacon device 130 herein described.

In an example embodiment, the one or more beacon devices establish network 120 connections with one or more user computing devices (not shown) in proximity and transmit advertising packets to the one or more user computing devices. For example, if the merchant system location is a supermarket, the one or more beacon devices may transmit offers, coupons, loyalty cards, or other useful or relevant information to user computing devices in network 120 proximity. In an example embodiment, a user computing device comprises a mobile phone, tablet, or other mobile device able to connect to a network 120. In another example embodiment, the one or more beacon devices facilitate payments by user computing devices. In this example embodiment, a user computing device may allow payment only when it has a network 120 connection with a beacon device in proximity to a point of sale ("POS") terminal associated with the merchant system.

In block 320, availability data packets are transmitted by the master beacon device 130 and retransmitted by servant beacon devices 110 within the mesh network. In example embodiments described herein, servant beacon devices 110 comprise both servant beacon devices 110-a and high value servant beacon devices 110-b. The method for transmitting and retransmitting availability data packets in a wireless mesh network of beacon devices to establish a baseline of received signal strength indicator values between the devices is described in more detail hereinafter with reference to the method described in FIG. 4.

Figure 4:
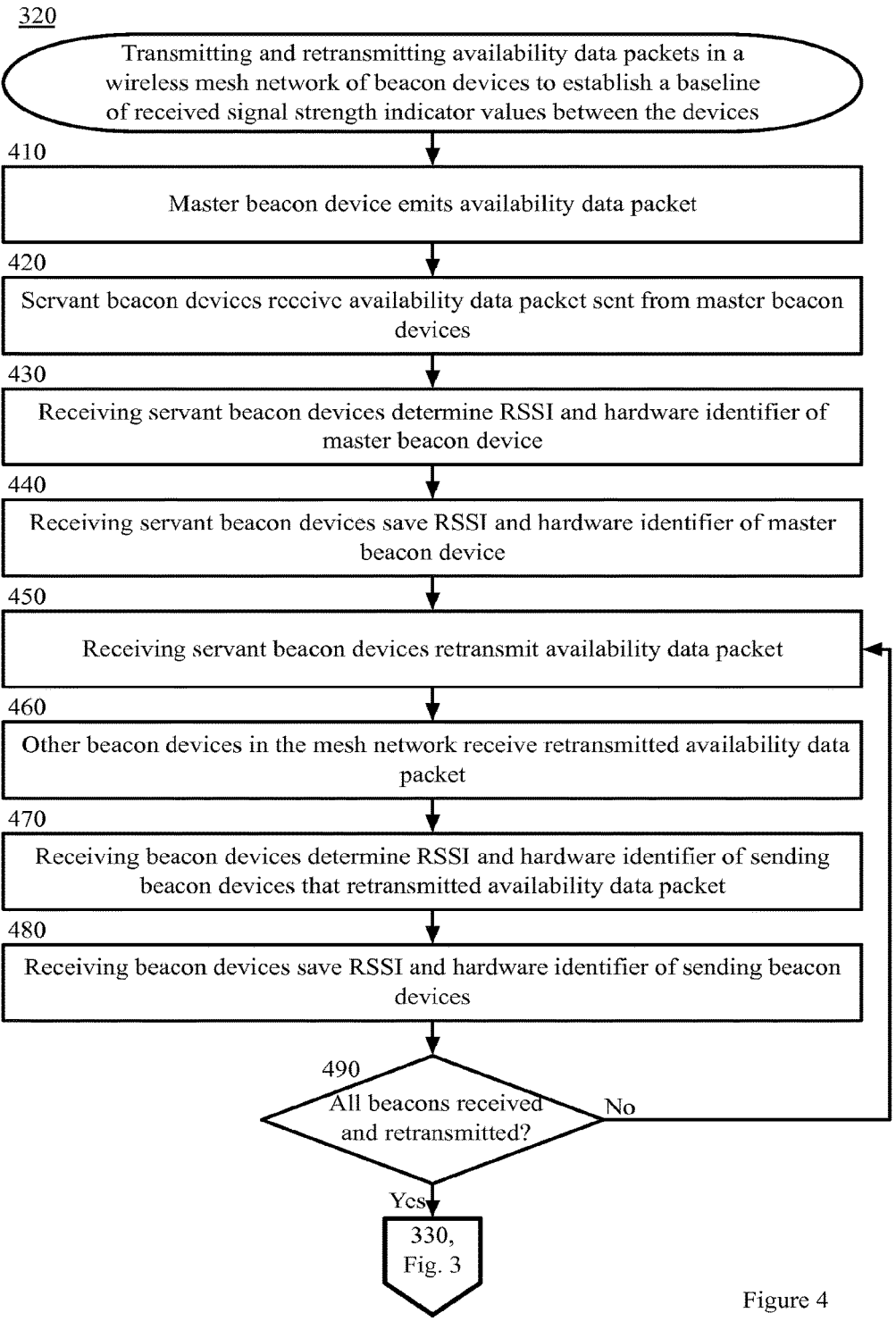
FIG. 4 is a block flow diagram depicting a method for transmitting and retransmitting availability data packets in a wireless mesh network of beacon devices to establish a baseline of received signal strength indicator values between the devices, in accordance with certain example embodiments.

FIG. 4 is a block diagram depicting a method 320 for transmitting and retransmitting availability data packets in a wireless mesh network of beacon devices to establish a baseline of received signal strength indicator values between the devices, in accordance with certain example embodiments. The method 320 is described with reference to the components illustrated in FIGS. 1-2.

In block 410, the master beacon device 130 emits an availability data packet. In an example embodiment, the availability data packet comprises a hardware identifier of the master beacon device. In an example, the hardware identifier may comprise a hardware ID or a MAC address. In this example embodiment, the hardware identifier may comprise a alphanumeric and/or symbolic characters that uniquely identify the network 120 interface of a beacon device or other hardware component of the beacon device.

In block 420, one or more servant beacon devices 110 receive the availability data packet sent from the master beacon device 130. As previously discussed, servant beacon devices 110 comprise both servant beacon devices 110-a and high value servant beacon devices 110-b. Returning to FIG. 2, in an example embodiment, the master beacon device 130 transmits the availability data packet and servant beacon devices 110 in proximity receive the availability data packet. In an example, servant beacon devices 110-i and 110-ix and high value servant beacon devices 110-A, 110-B, and 110-C are in network proximity to the master beacon device 130 and receive the availability data packet transmitted by the master beacon device 130 over one or more networks 120 (not shown).

Returning to FIG. 4, in block 430, the receiving servant beacon devices 110 determine the RSSI and hardware identifier of the master beacon device 130. In an example embodiment, the receiving servant beacon devices 110 extract the hardware identifier from the availability data packet sent from the master beacon device 130. In an example embodiment, the received signal strength indicator ("RSSI") indicates the relative strength of a radio signal received by a network 120 beacon device. In this example, the RSSI is the relative strength of the radio signal of the master beacon device 130 as received by the one or more servant beacon devices 110 receiving the availability data packet sent from the master beacon device 130. In an example embodiment, the RSSI may be an integer number on a logarithmic scale, such as a decibel scale. The RSSI may be used as a proxy to estimate the distance between two network 120 devices. For example, as a first network 120 device is moved away from a second network 120 device, the RSSI of the second network 120 device as determined by the first network 120 device decreases. Likewise, the RSSI of the first network 120 device as determined by the second network 120 device also decreases when the devices become farther apart from each other. In another example, as the first network 120 device is moved closer to a second network 120 device, the RSSI of the second network 120 device as determined by the first network 120 device increases. Likewise, the RSSI of the first network 120 device as determined by the second network 120 device also increases when the devices become closer together to each other. In another example embodiment, another proxy to estimate the distance between two network 120 devices is determined, for example, the free space path loss, the received channel power indicator ("RCPI"), the time of arrival ("TOA"), or any other appropriate measure to estimate the distance between the network 120 devices.

In block 440, the receiving servant beacon devices 110 save the RSSI and hardware identifier of the master beacon device 130. In an example embodiment, the receiving high value servant beacon devices 110-b and servant beacon devices 110-a save the information in a data storage unit 132 or data storage unit 112, respectively.

In block 450, the receiving servant beacon devices 110 retransmit the availability data packet. In an example embodiment, each of the receiving servant beacon devices 110 transmits an availability data packet comprising its unique hardware identifier. In this example embodiment, the retransmitted availability data packet may further comprise the hardware identifier of the master beacon device 130 which first transmitted the availability data packet. In this example embodiment, the hardware identifier enables a beacon device receiving a data packet to identify the transmitting beacon device and/or the master beacon device 130. Returning to FIG. 2, in an example, the high value servant beacon device 110-B received the availability data packet transmitted by the master beacon device 130. In this example embodiment, the high value servant beacon device 110-B inserts its hardware identifier into the availability data packet and retransmits the availability data packet.

Returning to FIG. 4, in block 460, other beacon devices in the mesh network receive the retransmitted availability data packet. In an example embodiment, the other beacon devices receiving the retransmitted availability data packet may comprise one or more servant beacon devices 110 and/or the master beacon device 130. As previously discussed, one or more servant beacon devices 110, as described herein, may comprise one or more servant beacon devices 110-*a* and/or one or more high value servant beacon devices 110-*b*. Returning to FIG. 2, in an example, the high value servant beacon device 110-B retransmitted the availability data packet received from the master beacon device 130 and retransmits the availability data packet after inserting its hardware identifier. In this example, the master beacon device 130 and the servant beacon devices 110-*vii*, 110-*viii*, and 110-*ix* are in network proximity to the high value servant beacon device 110-B, so these devices receive the retransmitted availability data packet.

In block 470, the receiving beacon devices determine the RSSI and hardware identifier of sending beacon devices that retransmitted the availability data packet. In this example embodiment, the receiving beacon devices comprise the other beacon devices that received the retransmitted availability data packet. Returning to FIG. 2, in an example, the high value servant beacon device 110-B retransmits the availability data packet received from the master beacon device 130 after inserting its hardware identifier. In this example, the master beacon device 130 and the servant beacon devices 110-*vii*, 110-*viii*, and 110-*ix* are in network proximity to the high value servant beacon device 110-B, so these devices receive the retransmitted availability data packet. In this example, each of the receiving beacon devices (the master beacon device 130 and the servant beacon devices 110-*vii*, 110-*viii*, and 110-*ix*) determine the RSSI and hardware identifier of the high value servant beacon device 110-B from which the data packet was received.

Returning to FIG. 4, in block 480, the receiving beacon devices save the RSSI and hardware identifier of sending beacon devices. In an example embodiment, the receiving high value servant beacon devices 110-*b* and servant beacon devices 110-*a* save the information in a data storage unit 132 or data storage unit 112, respectively. A receiving master beacon device 130 may save the information in a data storage unit 132.

In block 490, the beacon devices in the mesh network determine whether they have all received and retransmitted the availability data packet. In an example embodiment, each the one or more servant beacon devices 110 transmit, receive, and retransmit availability data packets until no new availability data packets are received. In this example embodiment, the master beacon device 130 transmits an availability data packet until it receives no new availability data packets. In this example embodiment, a new availability data packet is an availability data packet comprising a unique hardware identifier. In an example embodiment, after all beacon devices have received and retransmitted availability data packets, each beacon device has saved the hardware identifier and RSSI of all beacon devices in network 120 proximity. As previously mentioned, the free space path loss, the received channel power indicator ("RCPI"), the time of arrival ("TOA"), or any other appropriate measure to estimate the distance between network 120 devices may be used instead of or in addition to the RSSI.

If not all beacon devices in the mesh network have received and retransmitted the availability data packet, the method 320 proceeds to block 450, and the beacon devices continue to receive and retransmit the availability data packet until all beacon devices in the mesh network have received and retransmitted the availability data packet.

Returning to block 490, if all beacon devices in the mesh network have received and retransmitted the availability data packet, the method 320 proceeds to block 330 in FIG. 3. In an example embodiment, after all beacon devices have received and retransmitted availability data packets, each beacon device has saved the hardware identifier and corresponding RSSI of all beacon devices in network 120 proximity having a unique hardware identifier.

Returning to FIG. 3, in block 330, survey data packets are transmitted and retransmitted from servant beacon devices 110 to the master beacon device 130. The method 330 for receiving, by a master beacon device 130, survey data packets from servant beacon devices 110 in a wireless network of beacon devices is described in more detail hereinafter with reference to the method described in FIG. 5.

Figure 5:
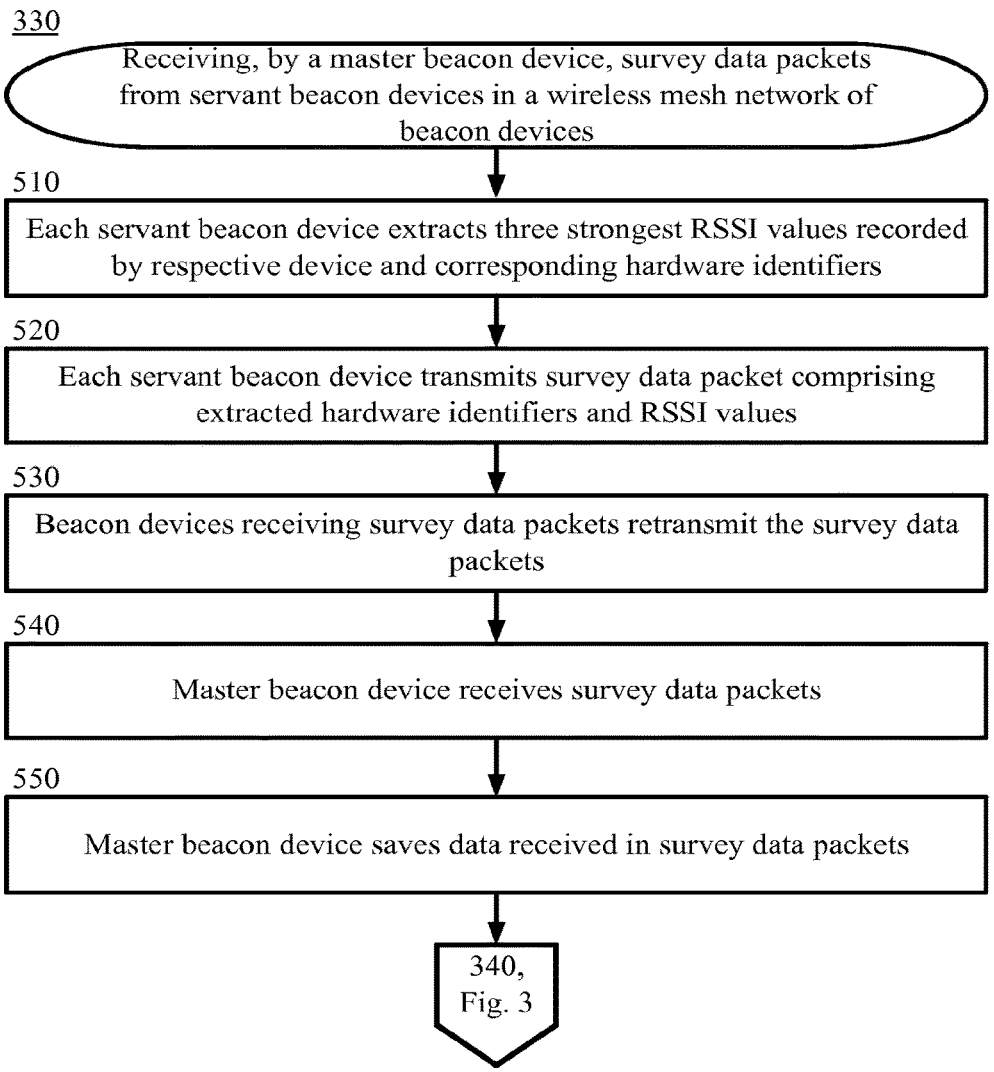
FIG. 5 is a block flow diagram depicting a method for receiving, by a master beacon device, survey data packets from high value and servant beacon devices in a wireless mesh network of beacon devices, in accordance with certain example embodiments.

FIG. 5 is a block diagram depicting a method 330 for receiving, by a master beacon device 130, survey data packets from servant beacon devices 110 in a wireless network of beacon devices, in accordance with certain example embodiments. The method 330 is described with reference to the components illustrated in FIG. 1.

In block 510, each servant beacon device 110 extracts the three strongest RSSI values recorded by the respective servant beacon device 110 and the corresponding hardware identifiers. For example, a servant beacon device 110-*a* (or a high value servant beacon device 110-*b*) saves an RSSI of 50 for a device comprising a hardware identifier "A", an RSSI of 70 for a device comprising a hardware identifier "B", an RSSI of 90 for a device comprising a hardware identifier "C", an RSSI of 95 for a device comprising a hardware identifier "D", and an RSSI of 110 for a device comprising a hardware identifier "E". In this example, the servant beacon device 110 extracts the RSSI and hardware identifiers corresponding to devices C, D, and E. In an example embodiment, because RSSI is a proxy measure for distance, the hardware identifiers corresponding to the three highest recorded RSSI values comprise the three beacon devices physically closest to the servant beacon device 110. In another example embodiment, each servant beacon device 110 extracts a definite number four or more of the strongest RSSI values and corresponding hardware identifiers. In yet another example embodiment, each servant beacon device 110 extracts a definite number less than three of the strongest RSSI values and corresponding hardware identifiers. In an example embodiment, the number of RSSI values and corresponding hardware identifiers may vary among servant beacon devices 130 in the wireless mesh network. In the example embodiments described herein, as previously discussed, servant beacon devices 110 comprise one or more servant beacon devices 110-*a* and/or one or more high value servant beacon devices 110-*b*.

In block 520, each servant beacon device 110 transmits a survey data packet comprising the extracted hardware identifiers and corresponding RSSI values. In an example embodiment, each servant beacon device 110 transmits a survey data packet further comprising its hardware identifier. In an example embodiment, each servant beacon device 110 transmits its survey data packet such that beacon devices in network 120 proximity may receive the survey data packet.

In block 530, beacon devices receiving the survey data packets retransmit the survey data packets. In an example embodiment one or more beacon devices receive the transmitted survey data packets. In this example embodiment, the one or more beacon devices receiving the transmitted survey data packets may comprise one or more servant beacon devices 110-a, one or more high value servant beacon devices 110-b, and/or the master beacon device 130. In an example embodiment, only servant beacon devices 110-a and high value servant beacon devices 110-b retransmit received survey data packets. In this example embodiment, the survey data packets may comprise the master beacon device 130 hardware identifier as a destination beacon device identifier. For example, a beacon device corresponding to the destination beacon device identifier, when it receives the survey data packet, does not retransmit the survey data packet. In an example embodiment, when the master beacon device 130 receives a survey data packet, the master beacon device 130 does not retransmit the survey data packet.

In block 540, the master beacon device 130 receives survey data packets. In an example embodiment, the master beacon device 130 attempts to receive survey data packets until the master beacon device 130 has not received a new survey data packet within a predefined time period. In this example embodiment, a new survey data packet is a survey data packet comprising a unique hardware identifier associated with the servant beacon device 110 that originally transmitted the survey data packet. For example, the master beacon device 130 is not aware of how many beacon devices are in the mesh network, so the master beacon device 130 insures that it receives survey data packets from as many beacon devices as possible by continuing to attempt to receive survey data packets for the predefined time period after each new survey data packet is received. In an example embodiment, the master beacon device 130 does not receive a new survey data packet within the predefined time period and ceases to attempt to receive survey data packets.

In block 550, the master beacon device 130 saves data received in the survey data packets. In an example embodiment, the data received in the survey data packets comprise the hardware identifiers and corresponding RSSI values detected by each servant beacon device 110 of proximate beacon devices in the wireless mesh network. In an example embodiment, the data is saved in a tabular format. In an example embodiment, a table may comprise rows and columns on which hardware identifiers of each known beacon device in the mesh network are listed. In this example embodiment, the rows may represent detecting beacon devices and the columns may represent detected beacon devices and RSSI values received in the survey data packets are saved in the correct place on the table according to which device detected the RSSI and which device was detected.

Returning to FIG. 2, in an example, a survey data packet originally transmitted by servant beacon device 110-i and received by the master beacon device 130 comprises the RSSI values as detected by the servant beacon device 110-i and the corresponding hardware identifiers of servant beacon device 110-ii, high value servant beacon device 110-A, and the master beacon device 130. In this example, these three devices are the devices with the highest RSSI values as detected by the servant beacon device 110-i. In this example, the master beacon device 130 saves the RSSI values and corresponding hardware identifiers received in the survey data packet. In another example, a survey data packet received by the master beacon device 130 and transmitted originally by the servant beacon device 110-v comprises the RSSI values as detected by the servant beacon device 110-v and the corresponding hardware identifiers of servant beacon devices 110-iv and 110-vi and high value servant beacon device 110-C. In this example, these three devices are the devices with the highest RSSI values as detected by the servant beacon device 110-v. In this example, the master beacon device 130 saves the RSSI values and corresponding hardware identifiers received in the survey data packet.

Returning to FIG. 3, in block 340, the master beacon device 130 application creates a first virtual map of the wireless mesh network based on the data received in the survey data packets and saves the virtual map. In an example embodiment, the master beacon device 130 receives data from each servant beacon device 130 comprising the three highest recorded RSSI values and corresponding hardwire identifiers. In an example embodiment, the master beacon device 130 considers the RSSI values as a proxy for distance between beacon devices. In an example embodiment, the virtual map of the wireless mesh network comprises a table, the rows of which list the hardware identifier of each beacon device in the mesh network of beacon devices for which the master beacon device 130 received a survey data packet and the columns of which list the RSSI values of the three beacon devices proximate to each beacon device as measured by the beacon device.

In block 350, the master beacon device transmits enrollment data packets. The method 350 for transmitting, by a master beacon device 130, enrollment data packets to each servant beacon device 110 in a mesh network is described in more detail hereinafter with reference to the method described in FIG. 6.

Figure 6:
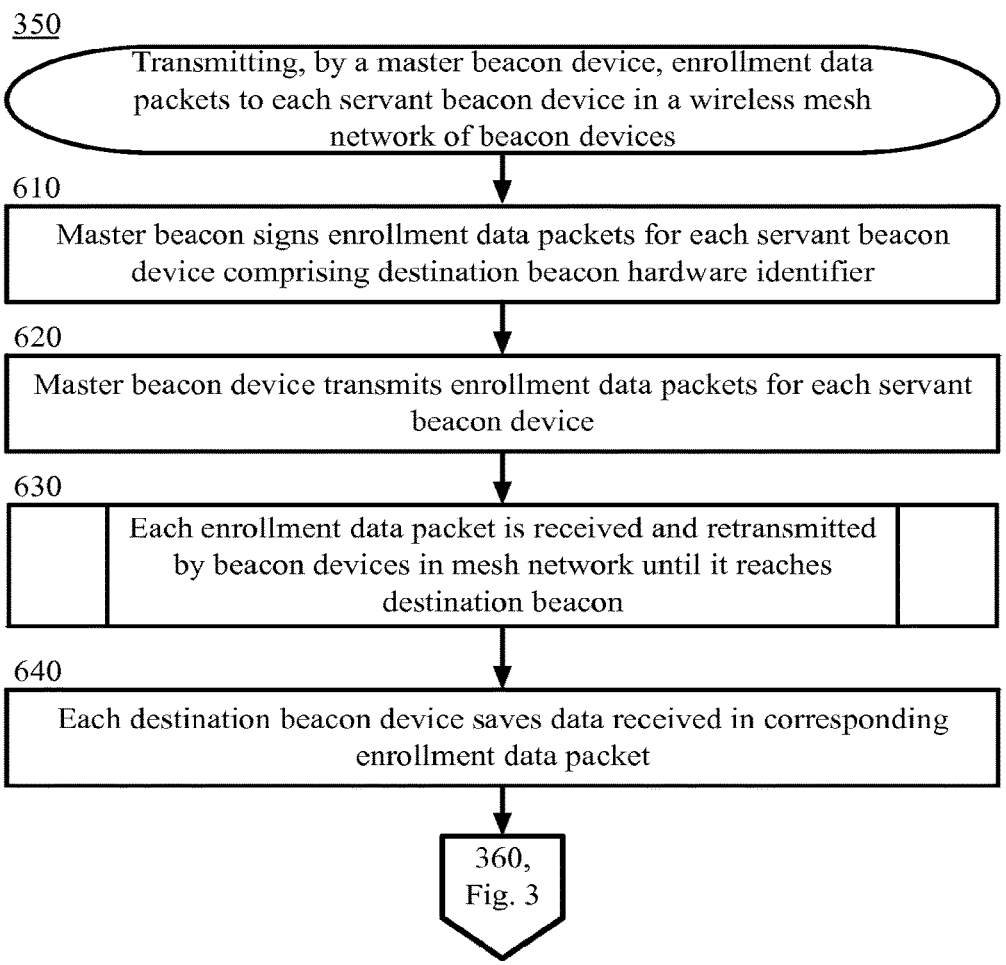
FIG. 6 is a block flow diagram depicting a method for transmitting, by a master beacon device, enrollment data packets to each servant beacon device in a mesh network of beacon devices, in accordance with certain example embodiments.

FIG. 6 is a block diagram depicting a method 350 for transmitting, by a master beacon device 130, enrollment data packets to each servant beacon device 110 in a mesh network, in accordance with certain example embodiments. The method 350 is described with reference to the components illustrated in FIG. 1.

In block 610, the master beacon device 130 signs enrollment data packets for each servant beacon device 110 comprising a destination beacon device hardware identifier. In an example embodiment, the enrollment data packet further comprises a list of at least three nearby beacon devices comprising the hardwire identifiers and RSSI values of the nearby beacon devices. In an example embodiment, the master beacon device 130 comprises a public key with which it signs the enrollment data packet. In this example embodiment, each of the one or more servant beacon devices 110 comprises a private key with which to verify the signature of its respective enrollment data packet. In an example embodiment, each enrollment data packet comprises a destination hardware identifier, enabling a receiving servant beacon device 110 to determine whether the enrollment data packet has reached its destination beacon device.

Returning to FIG. 2, in an example, the master beacon device 130 signs an enrollment data packet for the servant beacon device 110-iii comprising the servant beacon device's 110-iii hardware identifier as the destination beacon device hardware identifier. In this example, the enrollment data packet comprises a list of the RSSI values and corresponding servant beacon device 110 identifiers associated with servant beacon devices 110-*ii* and 110-*iv* and high value servant beacon device 110-A (the three beacon devices closest to the destination beacon device based on the first virtual map). In this example, the RSSI values are reference values from the first virtual map created by the master beacon device 130 from data received in the survey data packets. In another example, the master beacon device 130 signs an enrollment data packet for the high value servant beacon device 110-B comprising the beacon device's 110-B hardware identifier as the destination beacon device hardware identifier. In this example, the enrollment data packet comprises a list of the RSSI values and corresponding servant beacon device 110 identifiers associated with servant beacon devices 110-*vii* and 110-*ix* and the master beacon device 130 (the three beacon devices closest to the destination beacon device based on the first virtual map). In this example, the RSSI values are reference values from the first virtual map created by the master beacon device 130 from data received in the survey data packets.

Returning to FIG. 6, in block 620, the master beacon device 130 transmits the enrollment data packets to the servant beacon devices 110. In an example embodiment, an enrollment data packet is transmitted for each servant beacon device 110. In an example embodiment, the master beacon device 130 transmits the enrollment data packets so that proximate servant beacon devices 110 may receive the enrollment data packets.

In block 630, each enrollment data packet is received and retransmitted by beacon devices in the mesh network until it reaches the appropriate destination beacon device. The method for receiving and retransmitting enrollment data packets by beacon devices in a wireless mesh network is described in more detail hereinafter with reference to the method described in FIG. 7. Other appropriate methods for transmitting enrollment data packets from the master beacon device 130 to each of the servant beacon devices 110 may also be used.

Figure 7:
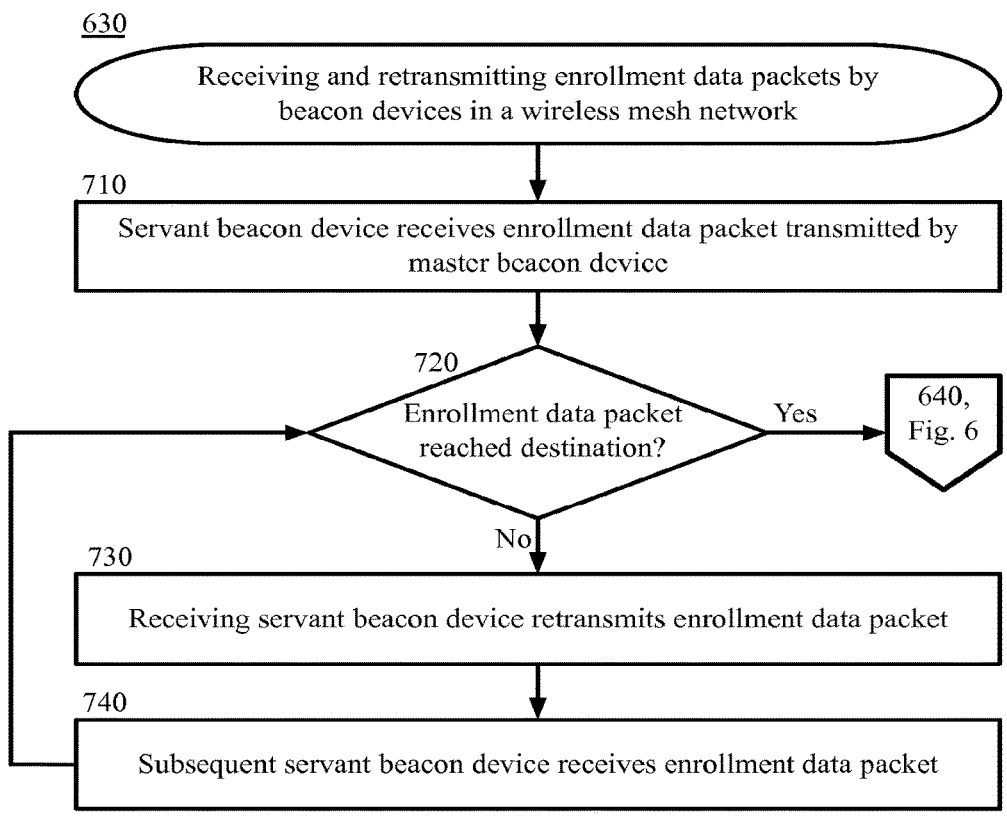
FIG. 7 is a block flow diagram depicting a method for receiving and retransmitting enrollment data packets by beacon devices in wireless mesh network, in accordance with certain example embodiments.

FIG. 7 is a block diagram depicting a method 630 for receiving and retransmitting enrollment data packets by beacon devices in a wireless mesh network, in accordance with certain example embodiments. The method 630 is described with reference to the components illustrated in FIG. 1. Other appropriate methods for transmitting enrollment data packets from the master beacon device 130 to each of the servant beacon devices 110 may also be used.

In block 710, a servant beacon device 110 receives the enrollment data packet transmitted by the master beacon device.

In block 720, the receiving beacon device determines whether the enrollment data packet has reached its destination beacon device. In an example embodiment, the receiving servant beacon device 110 determines whether the destination beacon device identifier in the enrollment data packet matches the beacon device identifier of the servant beacon device 110. In an example embodiment, if the beacon device identifiers match, the receiving servant beacon device 110 determines that the enrollment data packet has reached its destination beacon device. In this example embodiment, if the beacon device identifiers do not match, the receiving servant beacon device 110 determines that the enrollment data packet has not reached its destination beacon device.

If the enrollment data packet has not reached its destination, the method 630 proceeds to block 730.

In block 730, the receiving servant beacon device 110 retransmits the enrollment data packet. In an example embodiment, the receiving servant beacon device 110 retransmits the enrollment data packets so that servant beacon devices 110 in proximity to the receiving servant beacon device 110 may receive the enrollment data packets.

In block 740, a subsequent servant beacon device 110 receives the enrollment data packet. The method 630 then proceeds to block 720. In this example embodiment, the subsequent servant beacon device 110 determines whether the enrollment data packet has reached its destination beacon device to determine whether to retransmit the enrollment data packet.

Returning to block 720, if the enrollment data packet has reached its destination, the method 630 proceeds to block 640, in FIG. 6.

Returning to FIG. 6, in block 640, each destination beacon device verifies its corresponding enrollment data packet. For example, a corresponding enrollment data packet comprises a destination hardware identifier that is the same as the hardware identifier of the receiving destination servant beacon device 110. In an example embodiment, each destination servant beacon device 110 comprises a private key with which it verifies the signature of its corresponding enrollment data packet.

In block 650, each destination beacon device saves data received in its corresponding enrollment data packet. As previously discussed, the enrollment data packet may comprise a list of hardware identifiers and corresponding RSSI values of three or more beacon devices in proximity to the destination servant beacon device 110.

Returning to FIG. 3, in block 360, authentication data packets are transmitted to the master beacon device. The method for transmitting and retransmitting authentication data packets by beacon devices in a mesh network to the master beacon device 130 is described in more detail hereinafter with reference to the method described in FIG. 7.

Figure 8:
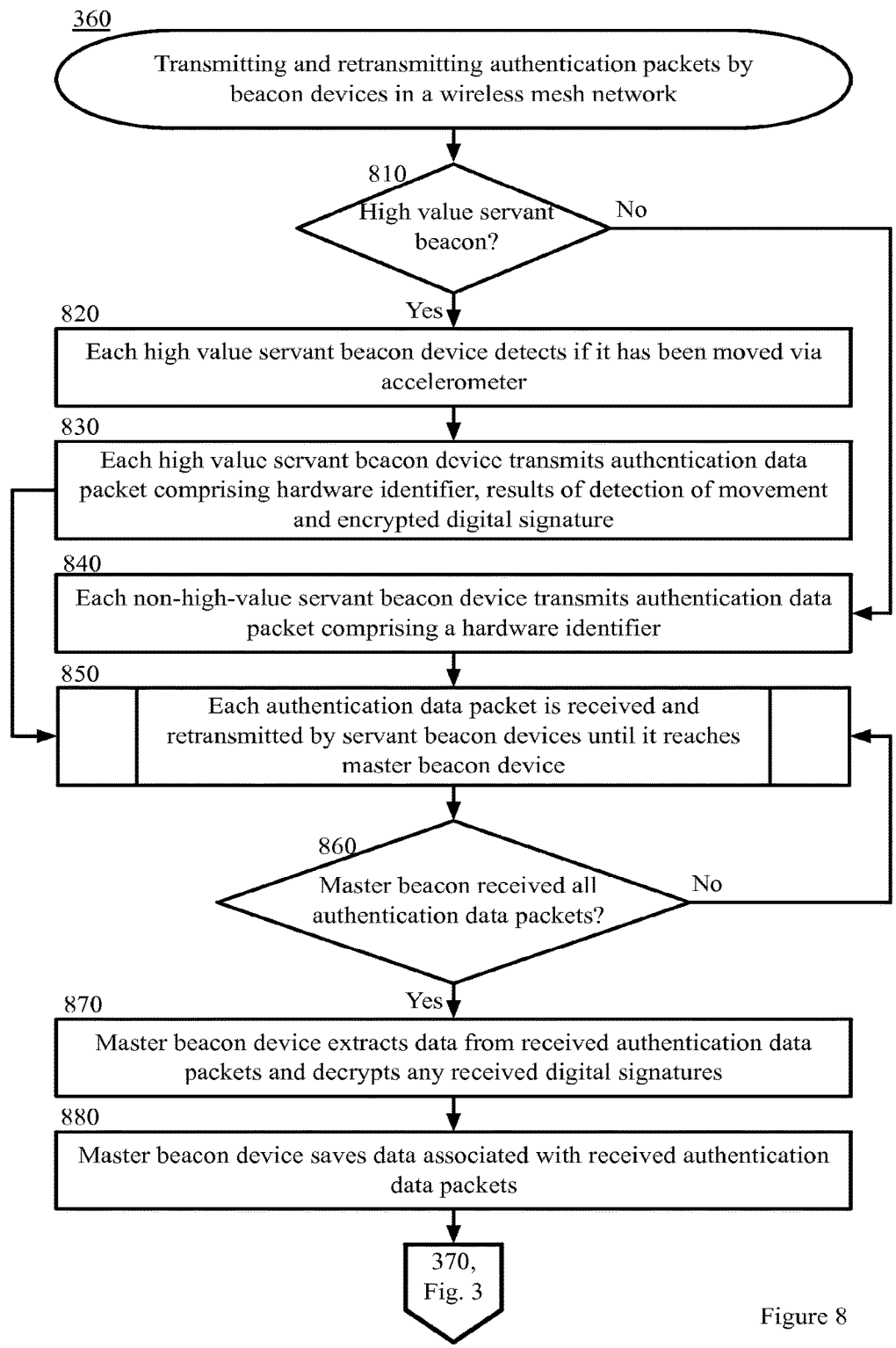
FIG. 8 is a block flow diagram depicting a method for transmitting and retransmitting authentication data packets by beacon devices in a wireless mesh network, in accordance with certain example embodiments.

FIG. 8 is a block diagram depicting a method 360 for transmitting and retransmitting authentication data packets by beacon devices in a mesh network to reach a master beacon device, in accordance with certain example embodiments. The method 360 is described with reference to the components illustrated in FIG. 1.

In block 810, the each servant beacon device 110 determines whether it is a high value servant beacon device 110-*b* or not. As previously discussed, a wireless mesh network comprises a master beacon device 130, one or more servant beacon devices 110-*b*, and one or more high value servant beacon devices 110-*b*. In this example embodiment, servant beacon devices 110-*a* comprise an application 111, a controller 113, a data storage unit 112, and an antenna 115. In this example embodiment, high value servant beacon devices 110-*b* further comprise an accelerometer 137 and a secure element 137.

If a servant beacon device is a high value servant beacon device 110-*b*, the method 360 proceeds to block 820.

In block 820, the high value servant beacon device 110-*b* detects if it has been moved using an accelerometer 137. For example, a beacon device may be moved for fraudulent purposes. In an example embodiment, a user computing device (not shown), such as a mobile phone or a tablet device, may only transact with a merchant system if the user computing device is in proximity to a beacon device associated with the merchant system. In this example, a high value servant beacon device 110-*b* located near a point of service ("POS") terminal associated with the merchant system is moved closer to a user computing device to attempt to cause the user computing device to allow a financial transaction with a fraudulent entity. In this example embodiment, the accelerometer 137 on the high value servant beacon device 110-*b* detects that the high value servant beacon device 110-*b* has moved.

In block 830, the high value servant beacon device 110-*b* transmits an authentication data packet comprising a hardware identifier identifying the servant beacon device, results of a detection of movement and an encrypted digital signature. The method 360 then proceeds to block 850. In an example, the results of the detection of movement comprise an alert that the high value servant beacon device 110-*b* has moved. In another example, the results of the detection of movement comprise an indication that the high value servant beacon device 110-*b* has not moved. In an example embodiment, the digital signature identifies the high value servant beacon device 110-*b* as being associated with a merchant system associated with the master beacon device 130 and wireless mesh network. In this example embodiment, the master beacon device 130 comprises a public key with which it is able to decrypt the digital signature to verify that the high value servant beacon device 110-*b* is associated with the merchant system. In an example embodiment, each servant beacon device 110-*b* transmits its authentication data packet such that beacon devices in network 120 proximity may receive the authentication data packet. In an example embodiment, each servant beacon device 110-*b* transmits its authentication data packet to each of the one or more beacon devices on the list received from the master beacon device 130 in the enrollment data packet. As previously discussed, the enrollment data packet may comprise a list of hardware identifiers and corresponding RSSI values of three or more beacon devices in proximity to the destination beacon device. In an example embodiment, the authentication data packet comprises a destination beacon device identifier comprising the master beacon device 130 hardware identifier. In this example embodiment, a receiving servant beacon device 110, in response to receiving the authentication data packet comprising the destination beacon device identifier identifying the master beacon device 130, retransmits the authentication data packet.

Returning to block 810, for each servant beacon device that is not a high value servant beacon device 110-*b*, the method 360 proceeds to block 840.

In block 840, each servant beacon device 110-*a* transmits an authentication data packet comprising a hardware identifier. The method 360 then proceeds to block 850. In an example embodiment, each servant beacon device 110-*a* transmits its authentication data packet such that beacon devices in network 120 proximity may receive the authentication data packet. In an example embodiment, each servant beacon device 110-*a* transmits its authentication data packet to each of the one or more beacon devices on the list of proximate beacon devices received from the master beacon device 130 in the enrollment data packet. As previously discussed, the enrollment data packet may comprise a list of hardware identifiers and corresponding RSSI values of three or more beacon devices in proximity to the destination beacon device. In an example embodiment, the authentication data packet comprises a destination beacon device identifier comprising the master beacon device 130 hardware identifier. In this example embodiment, a receiving servant beacon device 110, in response to receiving the authentication data packet comprising the destination beacon device identifier identifying the master beacon device 130, retransmits the authentication data packet.

In block 850, each authentication data packet is received and retransmitted until it reaches the master beacon device 130. The method 850 for receiving authentication data packets, recording an RSSI of the sending beacon device, and retransmitting authentication data packets by beacon devices in a wireless mesh network is described in more detail hereinafter with reference to the method described in FIG. 9.

Figure 9:
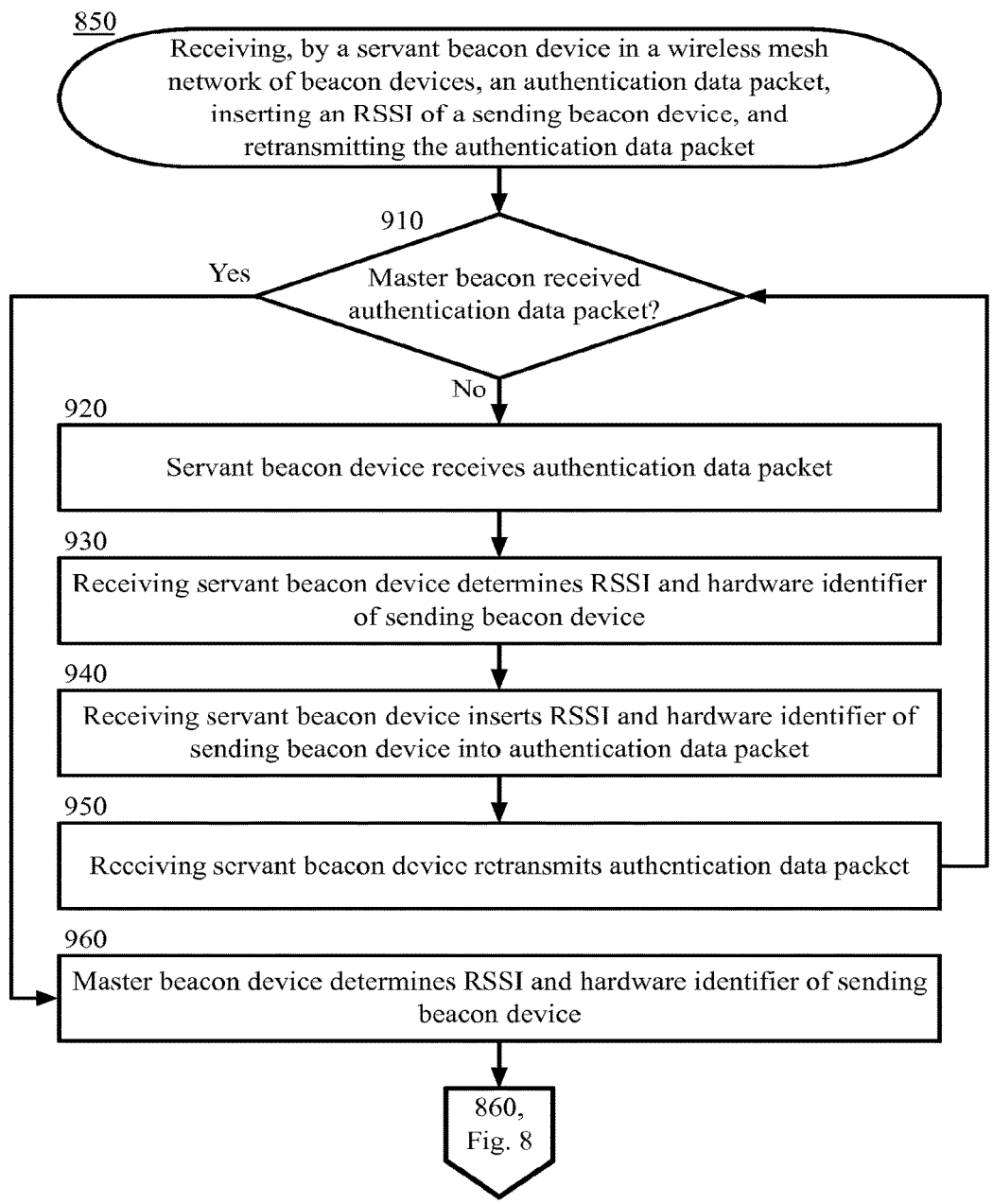
FIG. 9 is a block flow diagram depicting a method for receiving, by a servant beacon device in a wireless mesh network of beacon devices, an authentication data packet, inserting an RSSI of a sending beacon device, and retransmitting the authentication data packet, in accordance with certain example embodiments.

FIG. 9 is a block diagram depicting a method 850 for receiving an authentication data packet, inserting an RSSI of the sending beacon device, and retransmitting the authentication data packet by beacon devices in a wireless mesh network, in accordance with certain example embodiments. The method 850 is described with reference to the components illustrated in FIG. 1.

In block 910, it is determined whether the master beacon device 130 has received an authentication data packet. In an example embodiment, an authentication data packet is transmitted directly from a servant beacon device 110 to the master beacon device 130. In another example embodiment, an authentication data packet is transmitted from a first servant beacon device 110 to the master beacon device 130 via one or more intermediate servant beacon devices 110, which receive and retransmit the authentication data packet until it reaches the master beacon device 130.

If the master beacon device 130 has not received an authentication data packet, the method 850 proceeds to block 920.

In block 920, a servant beacon device 110 receives the authentication data packet. As previously discussed, servant beacon devices 110 comprise both servant beacon devices 110-*a* and high value servant beacon devices 110-*b*. In an example embodiment, the servant beacon device 110 determines whether its hardware identifier matches the destination beacon device identifier in the authentication data packet. In this example embodiment, the hardware identifier of the receiving servant beacon device 110 does not match the destination beacon device identifier, and the receiving servant beacon device 110 determines that the authentication data packet should be retransmitted to reach the master beacon device 130.

In block 930, the receiving servant beacon device 110 determines the RSSI and hardware identifier of the sending beacon device. In an example embodiment, each time the authentication data packet is received by a servant beacon device 110, the receiving servant beacon device 110 determines the RSSI and hardware identifier of the beacon device from which the receiving servant beacon device 110 received the authentication data packet.

In block 940, the receiving servant beacon device 110 inserts the RSSI and hardware identifier of the sending beacon device into the authentication data packet. In an example embodiment, each time the authentication data packet is received by a receiving servant beacon device 110, the receiving servant beacon device 110 inserts the RSSI and hardware identifier of the beacon device from which the receiving servant beacon device 110 received the authentication data packet.

In block 950, the receiving servant beacon device 110 retransmits the authentication data packet. The method 850 then proceeds to block 910.

Returning to block 910, if the master beacon device 130 receives the authentication data packet, the method proceeds to block 960. In another example embodiment, the master beacon device 130 receives a retransmitted authentication data packet from a servant beacon device 110 other than the original sending servant beacon device 110.

In block 960, the master beacon device 130 determines the RSSI and hardware identifier of the sending beacon device.

Returning to FIG. 2, in an example, servant beacon device 110-*iv* transmits an authentication data packet comprising the hardware identifier of the servant beacon device 110-*iv*, which is received by servant beacon device 110-*v*. In this example, servant beacon device 110-*v* detects and inserts the RSSI value of the servant beacon device 110-*iv* and inserts its own hardware identifier. The servant beacon device 110-*v* retransmits the authentication data packet and it is received by the high value servant beacon device 110-C. The high value servant beacon device detects and inserts the RSSI value of the servant beacon device 110-*v*, inserts its own hardware identifier, and retransmits the authentication data packet. In this example, the master beacon device 130 receives the retransmitted authentication data packet comprising hardware identifiers for the servant beacon devices 110-*iv*, 110-*v* and high value servant beacon device 110-C and the RSSI values for servant beacon device 110-*iv* and servant beacon device 110-*v*. In this example, the master beacon device 130 detects the RSSI of the sending high value servant beacon device 110-C and determines the corresponding hardware identifier of the high value servant beacon device 110-C received in the authentication data packet. In this example, the master beacon device 130 now has data comprising the RSSI of the servant beacon device 110-*iv* as determined by the servant beacon device 110-*v*, the RSSI of the servant beacon device 110-*v* as determined by the high value servant beacon device 110-C, and the RSSI of the high value servant beacon device 110-C as determined by the master beacon device 130.

In another example, high value servant beacon device 110-C transmits an authentication data packet, which is received by servant beacon device 110-*vi*. In this example, the authentication data packet comprises the hardware identifier of the high value servant beacon device 110-C, a results of a detection of movement and an encrypted digital signature. In this example, servant beacon device 110-*vi* detects the RSSI value of the servant beacon device 110-*iv* and inserts this RSSI value into the authentication data packet along with the hardware identifier of the servant beacon device 110-*vi*. The servant beacon device 110-*vi* retransmits the authentication data packet and it is received by the high value servant beacon device 110-B. The high value servant beacon device 110-B detects and inserts the RSSI value of the servant beacon device 110-*vi* and retransmits the authentication data packet. In this example, the master beacon device 130 receives the retransmitted authentication data packet comprising the hardware identifiers for high value servant beacon device 110-C, servant beacon device 110-*vi*, and high value servant beacon device 110-B and the RSSI values for high value servant beacon device 110-C and servant beacon device 110-*vi*. In this example, the master beacon device 130 detects the RSSI of the sending high value servant beacon device 110-B and determines the corresponding hardware identifier of the high value servant beacon device 110-B received in the authentication data packet. In this example, the master beacon device 130 now has data comprising the RSSI of the high value servant beacon device 110-C as determined by the servant beacon device 110-*vi*, the RSSI of the servant beacon device 110-*vi* as determined by the high value servant beacon device 110-B, and the RSSI of the high value servant beacon device 110-B as determined by the master beacon device 130.

Returning to FIG. 8, in block 860, the master beacon device 130 determines whether it has received all of the authentication data packets. In an example embodiment, the master beacon 130 determines that it has received all authentication data packets when it receives no new authentication data packets within a predefined length of time. In this example embodiment, a new authentication data packet is an authentication data packet comprising a unique hardware identifier associated with the servant beacon device 110 which first transmitted the authentication data packet.

In an example embodiment, the master beacon device 130 may receive a plurality of authentication data packets comprising a hardware identifier associated with a servant beacon device 110 which first transmitted the authentication data packets. In this example embodiment, the authentication data packets may arrive to the master beacon device 130 via one or more different retransmitting servant beacon devices 110. Returning to FIG. 2, for example, high value servant beacon device 110-A transmits an authentication data packet, which is retransmitted by servant beacon device 110-*iii* to servant beacon device 110-*ii*, which is retransmitted by servant beacon 110-*ii* to servant beacon device 110-*i*, which is retransmitted by servant beacon device 110-*i* to the master beacon device 130. In this same example, the high value servant beacon device's 110-A authentication data packet may be retransmitted by servant beacon device 110-*i* to servant beacon device 110-*ix*, retransmitted by servant beacon device 110-*ix* to high value servant beacon device 110-B, and further retransmitted by high value servant beacon device 110-B to the master beacon device 130. In this same example, the high value servant beacon device's 110-A authentication data packet may be retransmitted by servant beacon device 110-*iii* to servant beacon device 110-*iv*, retransmitted by servant beacon device 110-*iv* to high value servant beacon device 110-C, and further retransmitted by high value servant beacon device 110-C to the master beacon device 130. Therefore, as this example illustrates, an authentication data packet transmitted by a single servant beacon device 110 may take various routes as it is retransmitted through the wireless mesh network of beacon devices to the master beacon device 130. In these examples, intermediate retransmitting servant beacon devices 110 detect an RSSI from the immediate beacon device from which the authentication data packet was received and insert a hardware identifier of the retransmitting beacon device, as previously discussed.

Returning to FIG. 8, if the master beacon device 130 has not received all of the authentication data packets, the method 360 proceeds to block 850. For example, the master beacon device 130 has received a new authentication data packet within a predefined length of time, therefore the master beacon device 130 continues to receive authentication data packets and retransmitted authentication data packets from servant beacon devices 110. In this example, a new authentication data packet is an authentication data packet comprising a unique hardware identifier associated with the servant beacon device 110 which first transmitted the authentication data packet.

Returning to block 860, if the master beacon device 130 has received all of the authentication data packets, the method 360 proceeds to block 870. For example, the master beacon device 130 has not received a new authentication data packet within a predefined length of time, therefore the master beacon device 130 determines that it has received all of the authentication data packets.

In block 870, the master beacon device 130 extracts data from the received authentication data packets and decrypts any received digital signatures. In an example embodiment, the master beacon device 130 comprises a private key that corresponds to a public key associated with each of the one or more high value servant beacon devices 110-*b*. In this example embodiment, the master beacon device 130 decrypts a received digital signature via the private key that was created by a high value servant beacon device 110-*b* via the public key. In yet another example embodiment, a different cryptography system other than public key cryptography is used to create digital signatures by high value servant beacon devices 110-*b* and decrypt digital signatures by the master beacon device 130. For example, symmetric key cryptographic system may be used wherein the master beacon device 130 and the one or more high value servant beacon devices 110-*b* comprise the same key used to both create and decrypt digital signatures.

In block 880, the master beacon device 130 saves data associated with the received authentication data packets. In an example embodiment, the data is saved in a tabular format. In an example embodiment, a table may comprise rows and columns on which hardware identifiers of each beacon device in the mesh network are listed. In this example embodiment, the rows may represent detecting beacon devices and the columns may represent detected beacon devices and RSSI values received in the authentication data packets are saved in the correct place on the table according to which device detected the RSSI and which device was detected.

Returning to FIG. 3, in block 370, the master beacon device 130 determines if the network connection is secure. The method for determining the security of a wireless mesh network of beacon devices is described in more detail hereinafter with reference to the method described in FIG. 10.

Figure 10:
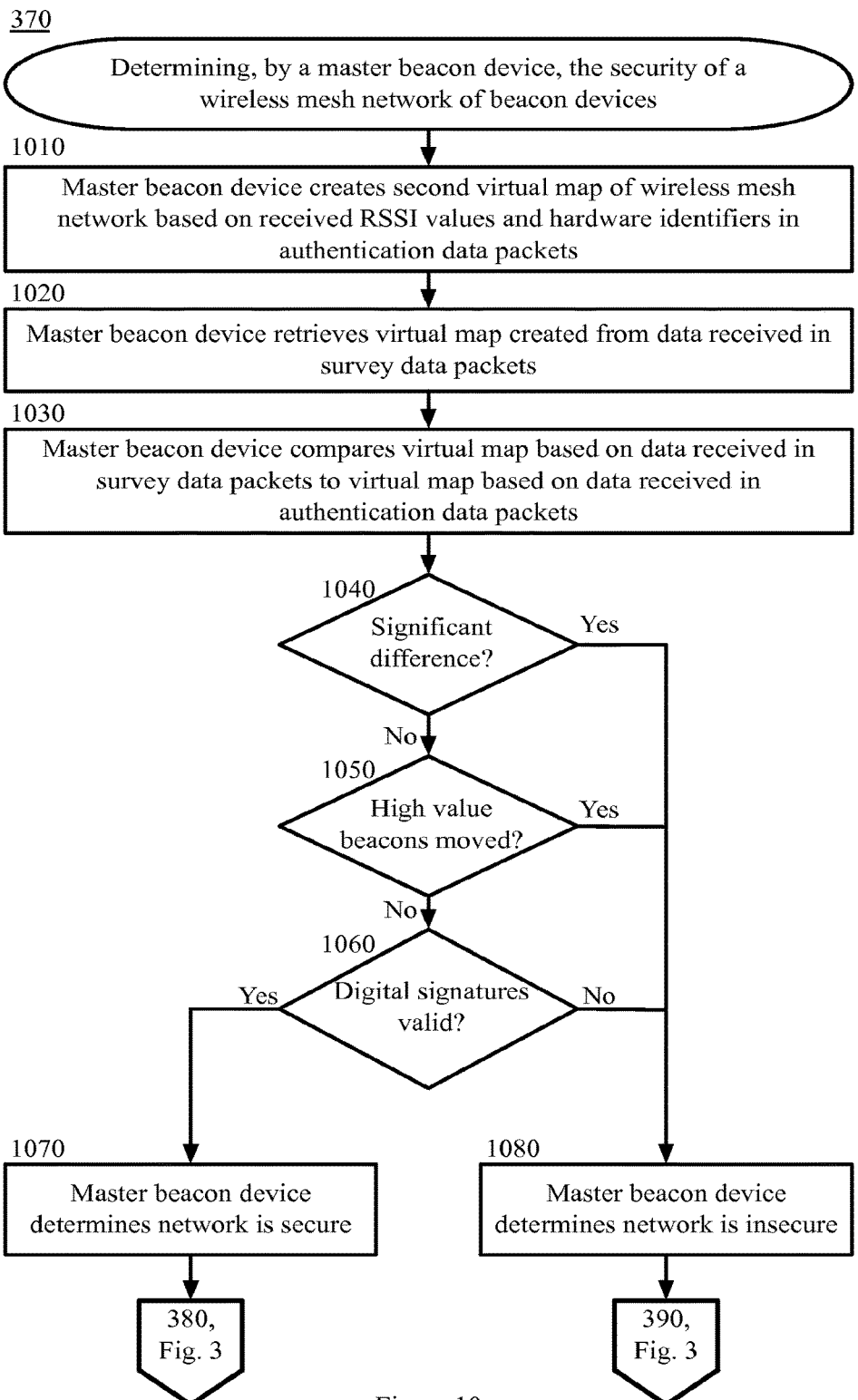
FIG. 10 is a block flow diagram depicting a method for determining, by a master beacon device, the security of a wireless mesh network of beacon devices, in accordance with certain example embodiments.

FIG. 10 is a block diagram depicting a method 370 for determining the security of a wireless mesh network of beacon devices, in accordance with certain example embodiments. The method 370 is described with reference to the components illustrated in FIG. 1.

In block 1010, the master beacon device 130 creates a second virtual map of the wireless mesh network based on received RSSI values and hardware identifiers received in the authentication data packets. In an example embodiment, the second virtual map comprises the same format as the first virtual map. For example, the second virtual map comprises a table similar to the previously discussed first virtual map, wherein the rows comprise detecting beacon device hardware identifiers, the columns comprise detected beacon device hardware identifiers and each RSSI value in the table represents the RSSI value of the detected beacon device corresponding to the row of the table as detected by the detecting beacon device corresponding to the column of the table.

In block 1020, the master beacon device 130 retrieves the first virtual map created from the data received in the survey data packets.

In block 1030, the master beacon device 130 compares the virtual map based on the data received in the survey data packets to the virtual map based on the data received in the authentication data packets.

In block 1040, the master beacon device 130 determines whether a significant difference exists between the two virtual maps of the wireless mesh network. In an example embodiment, a significant difference exists between the first virtual map and the second virtual map if the RSSI values between one or more beacon devices varies more than a predefined amount between the two virtual maps. In this example embodiment, the predefined amount may be a range of instrumental measurement error for detecting an RSSI by a beacon device. In this example embodiment, each of the two virtual maps comprises, for each beacon device in the wireless mesh network, the detected RSSI values of proximate beacon devices. In this example embodiment, because the RSSI is a proxy used to estimate distance, any movement of a beacon device in the mesh network will cause changes in the RSSI values of one or more proximate beacon devices detected by the moved beacon device and will cause changes in the RSSI of the moved beacon device as detected by the one or more proximate beacon devices.

If a significant difference exists between the two virtual maps of the wireless mesh network, the method 370 proceeds to block 1080.

In an example, the master beacon device 130 creates a first virtual map of all the beacon devices in the example wireless mesh network illustrated in FIG. 2. In this example, the first virtual map comprises baseline RSSI values of each beacon device as measured by proximate beacon devices in the wireless mesh network. In this example, servant beacon device 110-*i*, at a time after the first virtual map is created, is moved an arbitrary distance to the south (with respect to the orientation of FIG. 2, an imaginary vertical axis being the north-south axis, the bottom of that axis being south). In this example, when authentication packets are transmitted by the servant beacon device 110-*i*, the servant beacon devices 110-*ii* and 110-*ix*, high value servant beacon device 110-A, and the master beacon device 130 receive the authentication packets and should detect a lower RSSI value of the servant beacon device 110-*i*, because the distance between the servant beacon device 110-*i* each beacon device receiving the authentication packet sent by the servant beacon device 110-*i* has increased. Likewise, the servant beacon device 110-*i* should detect lower RSSI values for the high value servant beacon device 110-A, the master beacon device 130, and the servant beacon devices 110-*ii* and 110-*ix* when it receives authentication packets from these respective beacon devices. In this example, when the authentication packets are retransmitted through the mesh network and reach the master beacon device 130, the master beacon device 130 creates a second virtual map of the wireless mesh network comprising these changed RSSI values. In this example, the master beacon device 130 determines that a significant difference exists between the first and second virtual maps due to the changes in the RSSI values between the servant beacon device 110-*i* and beacon devices in proximity to the servant beacon device 110-*i*. In this example, the significant difference exceeds a predetermined threshold. For example the predetermined threshold may be a margin of error for measuring the RSSI or other estimate of distance. In another example, the predetermined threshold is such that a minimal movement is tolerated, for example, a few millimeters in any direction. A larger predetermined threshold allows for more movement of the beacon devices in the mesh network but is less secure. A smaller predetermined threshold is more secure but allows for less movement (or no movement) of the beacon devices in the mesh network.

In another example, servant beacon device 110-*i* is replaced by an imposter beacon device X (not shown) and servant beacon device 110-*i* is moved to the south (as in the previous example) at a time after the master beacon device 130 creates the first virtual map of the example wireless mesh network of beacon devices illustrated in FIG. 2. In this example, the imposter beacon device X intercepts communications intended for servant beacon device 110-*i* and retransmits these communications to servant beacon device 110-*i*. Likewise, communications transmitted by servant beacon device 110-*i* are received and retransmitted by imposter beacon device X before being transmitted to other beacon devices and/or a user computing device (not shown) in proximity to the imposter beacon device X. In this example, the RSSI values of the servant beacon devices 110-*ii* and 110-*ix*, the high value servant beacon device 110-A, and the master beacon device 130 will be equal as detected by the servant beacon device 110-*i*. The detected RSSI values will be equal because the stationary imposter beacon device X intercepts the authentication packets from each device and retransmits the authentication packets to the servant beacon device 110-*i*. Therefore, the servant beacon device 110-*i* should detect the RSSI of the imposter beacon device X and insert this value in each received authentication data packet. In this example, when the authentication data packets are retransmitted to the master beacon device 130 through the wireless mesh network, the master beacon device 130 creates the second virtual map of the wireless mesh network. When compared to the first virtual map, the master beacon device 130 would probably determine that the second virtual map was significantly different from the first virtual map because the RSSI detected by the servant beacon device 110-*i* of supposed proximate beacon devices would all be the same value. Therefore, the only scenario in which the second virtual map would be determined to not be significantly different from the first virtual map would be if the servant beacon device 110-*i* was originally placed equidistant from all proximate beacon devices, the imposter beacon device X was placed in the exact location of the servant beacon device 110-*i*, and the servant beacon device 110-*i* was removed to a location the exact same distance from the imposter beacon device X as the proximate beacon devices are from the imposter beacon device X.

Returning to FIG. 10, in block 1080, if a significant difference exists between the two virtual maps of the wireless mesh network the master beacon device 130 determines that the wireless mesh network is insecure. The method 370 then proceeds to block 390 in FIG. 3. In an example embodiment, one or more network 120 connections in the wireless mesh network is disabled by the master beacon device 130.

Returning to block 1040, if a significant difference does not exist between the two virtual maps of the wireless mesh network, the method 370 proceeds to block 1050.

In block 1050, the master beacon device 130 determines whether any of the high value servant beacon devices 110-*b* have been moved. As previously discussed, in an example embodiment, each high value servant beacon device 110-*b* transmits an authentication data packet comprising results of a detection of movement. In this example embodiment, a detection of movement comprises a detection by an accelerometer 137 resident on the high value servant beacon device 110-*b* that the high value servant beacon device 110-*b* has been moved. In an example, the results of the detection of movement comprise an alert that the high value servant beacon device 110-*b* has moved. In another example, the results of the detection of movement comprise an indication that the high value servant beacon device 110-*b* has not moved. In an example embodiment, the master beacon device 130 receives the results of the detection of movement for each high value servant beacon device 110-*b* in the mesh network for which the master beacon device 130 receives an authentication data packet. In an example embodiment, based on the results of the detection of movement received in the authentication data packets, the master beacon device 130 determines if any of the high value servant beacon devices 110-*b* have moved.

If the master beacon device 130 determines that any of the high value servant beacon devices 110-*b* have moved, the method 370 proceeds to block 1080. In block 1080, the master beacon device 130 determines that the wireless mesh network is insecure. The method 370 then proceeds to block 390 in FIG. 3.

Returning to block 1050, if the master beacon device 130 determines that none of the high value servant beacon devices 110-*b* have moved, the method 370 proceeds to block 1060.

In block 1060, the master beacon device 130 determines whether received digital signatures are valid. In an example embodiment, the master beacon device 130 comprises a reference digital signature of the merchant system stored in the secure element 139 or other data storage unit 132. In this example embodiment, the master beacon device 130 compares each of the received and decrypted digital signatures to the reference digital signature. For example, a digital signature that matches the reference digital signature is a valid digital signature, and a digital signature that does not match the reference digital signature is an invalid digital signature.

If any of the received digital signatures is invalid, the method 370 proceeds to block 1080. In an example embodiment, one or more of the received and decrypted digital signatures does not match a reference digital signature of the merchant system, and the master beacon device 130 determines the digital signatures to be invalid. In block 1080, the master beacon device 130 determines that the wireless mesh network is insecure. The method 370 then proceeds to block 390 in FIG. 3.

Returning to block 1060, if the master beacon device 130 determines that the digital signatures are valid, the method 370 branches to block 1070.

In block 1070, the master beacon device 130 determines that the wireless mesh network is secure. For example, the master beacon device 130 determines that there are no significant differences between the first and second virtual maps, that none of the high value merchant beacon devices 110-*b* have moved based on data received in the authentication data packets, and that the digital signatures received from the high value servant beacon devices 110-*b* in the authentication data packets are valid. The method 370 then proceeds to block 380, in FIG. 3.

Returning to FIG. 3, in block 380, the master beacon device 130 determines whether to continue the network connection. In an example embodiment, a user computing device (not shown) has established a network connection with one or more of the beacon devices in the wireless mesh network. In this example embodiment, the user computing device or a user associated with the user computing device determines whether to continue a network connection with one or more beacon devices of the wireless mesh network.

If the master beacon device 130 determines to continue the wireless mesh network connection, the method 300 returns to block 320 and continues to monitor the wireless mesh network.

Returning to block 380, if the master beacon device 130 determines not to continue the wireless mesh network connection, the method 300 proceeds to block 390.

In block 390, the network is terminated. In an example embodiment, the master beacon device 130 found a significant difference between the first and second virtual maps of the wireless mesh network, determined that the mesh network was insecure, and terminated one or more network 120 connections in the mesh network. In another example embodiment, the master beacon device 130 received a detection of movement transmitted by one or more high value servant beacon devices 110-*b* in one or more authentication data packets, determined that the mesh network was insecure, and terminated one or more network 120 connections in the mesh network. In yet another example embodiment, the master beacon device 130 determined that one or more of one or more digital signatures received in authentication data packets originating from high value servant beacon devices 110-*b* are invalid, determined that the mesh network was insecure. In some example embodiments, in response to determining that the mesh network is insecure, the master beacon device 130 terminates one or more network 120 connections in the mesh network. In another embodiments, the master beacon device 130 transmits a notification to the merchant system 130, a network operator, and/or another appropriate entity that the mesh network is insecure. In this example embodiment, the master beacon device 130 may additionally transmit data relevant to making the determination that the network is insecure. For example, the master beacon device 130 may transmit one or more received results of a detection of movement, one or more received invalid digital signatures, and the first and second virtual maps comprising a significant difference between the first and second virtual maps. In this example, the network operator or other appropriate entity take appropriate action to secure or disable the mesh network.

Other Example Embodiments

FIG. 11 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method for securing a wireless mesh network of beacon devices, comprising:
    receiving, by a master beacon device and from a plurality of servant beacon devices in a mesh network, survey data comprising, for each of the servant beacon devices, a beacon device identifier and path loss information of proximate servant beacon devices detected by each servant beacon device;
    transmitting, by the master beacon device and to each of the plurality of servant beacon devices, enrollment data comprising beacon device identifiers and corresponding path loss values of proximate beacon devices to servant beacon devices determined from the received survey data, wherein the enrollment data may be retransmitted by servant beacon devices within the mesh network to reach other recipient servant beacon devices;
    receiving, by the master beacon device, authentication data from a plurality of servant beacon devices, the authentication data comprising beacon device identifiers for servant beacon devices and path loss information detected by servant beacon devices of proximate servant beacon devices;
    comparing, by the master beacon device, the received survey data to the received authentication data; and
    determining, by the master beacon device, that the mesh network is insecure based on identified differences between the path loss data from the received survey data and the path loss data from the received authentication data.

2. The method of claim 1, wherein the authentication data comprises beacon device identifiers for servant beacon devices and path loss information detected by servant beacon devices of at least three proximate servant beacon devices.

3. The method of claim 1, further comprising, transmitting, by the master beacon device, availability data, the availability data comprising a master beacon device identifier, wherein one or more servant beacon devices proximate to the master beacon device receive the availability data and retransmit the availability data, wherein one or more servant beacon devices not proximate to the master beacon device receive and retransmit the retransmitted availability data until all servant beacon devices in the mesh network receive and retransmit the availability data, and wherein each servant beacon determines the path loss and beacon device identifier of any beacon device from which availability data is directly received.

4. The method of claim 3, wherein each servant beacon device in the mesh network, at a time after receiving and retransmitting the availability data, transmits survey data comprising the beacon device identifier of the transmitting servant beacon device and the determined path loss and beacon device identifiers of proximate servant beacon devices, the survey data being received and retransmitted by one or more servant beacon devices in the mesh network until the master beacon device receives the survey data.

5. The method of claim 1, further comprising:
    determining, by the master beacon device, that the mesh network is secure based on not finding any significant differences between the path loss data from the received survey data and the path loss data from the received authentication data; and
    transmitting, by the master beacon device and to a user computing device, a notification that the mesh network is secure, wherein the user computing device establishes a network connection with one or more of the beacon devices in the mesh network and wherein the user computing device initiates a transaction with a merchant system associated with the mesh network upon receiving the notification that the mesh network is secure.

6. The method of claim 1, wherein one or more of the servant beacon devices in the mesh network comprise an accelerometer, wherein each of the servant beacon devices comprising an accelerometer, at a time before transmitting authentication data, determine any movement of the servant beacon device, wherein each of the servant beacon devices comprising an accelerometer transmits authentication data that further comprises a movement notification comprising the movement determination, and wherein determining that the network is insecure is further based on receipt of a movement notification indicating that one or more of the servant beacon devices has been moved.

7. The method of claim 1, wherein one or more of the servant beacon devices in the mesh network transmit authentication data that further comprises an encrypted digital signature encrypted by the servant beacon device from which the authentication data originates, wherein determining that the mesh network is insecure is further based on receipt of one or more invalid digital signatures received in the authentication data and further comprising, at a time before determining that the mesh network is insecure, determining, by the master beacon device, the validity of the one or more encrypted digital signatures received in the authentication data.

8. The method of claim 1, wherein, instead of the path loss, the received signal strength indicator, the received channel power indicator, the time of arrival, or the round trip time is detected.

9. The method of claim 4, wherein, instead of the path loss, the received signal strength indicator, the received channel power indicator, the time of arrival, or the round trip time is detected.

10. A computer program product, comprising:
    a non-transitory computer-readable medium having computer-readable program instructions embodied thereon that when executed by a computer cause the computer to secure a wireless mesh network of beacon devices, the computer readable instructions comprising:
        computer-readable program instructions to receive, from a plurality of servant beacon devices in a mesh network, survey data comprising, for each of the servant beacon devices, a beacon device identifier and path loss information of proximate servant beacon devices detected by each servant beacon device;
        computer-readable program instructions to transmit, to each of a plurality of servant beacon devices, enrollment data comprising beacon device identifiers and corresponding received signal strength indicator values of proximate beacon devices to servant beacon devices, wherein the enrollment data is based on the received survey data, wherein the enrollment data may be retransmitted by servant beacon devices within the mesh network to reach other recipient servant beacon devices, the enrollment data comprising a list of beacon devices in the mesh network identified by the beacon device identifiers and path loss information detected, for each servant beacon device, of beacon devices in proximity to the servant beacon device;

computer-readable program instructions for receiving authentication data from a plurality of servant beacon devices, the authentication data comprising beacon device identifiers for servant beacon devices and received signal strength indicator values detected by servant beacon devices of proximate servant beacon devices;

computer-readable program instructions for comparing the received survey data to the received authentication data to identify differences between the received survey data and the received authentication data;

computer-readable program instructions for determining that the mesh network is insecure based on identified differences between the received survey data and the received authentication data.

11. The computer program product of claim 10, further comprising:

computer-readable program instructions for detecting the received signal strength indicator of servant beacon devices from which survey data was directly received;

computer-readable program instructions for determining beacon device identifiers of the servant beacon devices from which survey data was directly received; and computer-readable program instructions for constructing a first virtual map of the mesh network based on the received survey data.

12. The computer program product of claim 10, further comprising transmitting availability data, the availability data comprising a master beacon device identifier, wherein one or more servant beacon devices proximate to the master beacon device receive the availability data and retransmit the availability data, wherein one or more servant beacon devices not proximate to the master beacon device receive and retransmit the retransmitted availability data until all servant beacon devices in the mesh network receive and retransmit the availability data, wherein each servant beacon determines the received signal strength indicator and beacon device identifier of any beacon device from which availability data is directly received.

13. The computer program product of claim 12, wherein each servant beacon device in the mesh network, at a time after receiving and retransmitting the availability data, transmits survey data comprising the beacon device identifier of the transmitting servant beacon device and the determined received signal strength indicator and beacon device identifiers of proximate servant beacon devices, the survey data being received and retransmitted by one or more servant beacon devices in the mesh network until the master beacon device receives the survey data.

14. The computer program product of claim 10, further comprising:

computer program instructions for determining that the mesh network is secure based on not finding any significant differences between the received survey data and the received authentication data; and computer program instructions for transmitting, to a user computing device, a notification that the mesh network is secure, wherein the user computing device establishes a network connection with one or more of the beacon devices in the mesh network and wherein the user computing device initiates a transaction with a merchant system associated with the mesh network upon receiving the notification that the mesh network is secure.

15. The computer program product of claim 10, wherein one or more of the servant beacon devices in the mesh network comprise an accelerometer, wherein each of the servant beacon devices comprising an accelerometer, at a time before transmitting authentication data, determine any movement of the servant beacon device, wherein each of the servant beacon devices comprising an accelerometer transmits authentication data that further comprises a movement notification comprising the movement determination, and wherein determining that the network is insecure is further based on receipt of a movement notification indicating that one or more of the servant beacon devices has been moved.

16. The computer program product of claim 10, wherein one or more of the servant beacon devices in the mesh network transmit authentication data that further comprises an encrypted digital signature encrypted by the servant beacon device from which the authentication data originates, wherein determining that the mesh network is insecure is further based on receipt of one or more invalid digital signatures received in the authentication data and further comprising, at a time before determining that the mesh network is insecure, computer program instructions for determining the validity of the one or more encrypted digital signatures received in the authentication data.

17. A system for securing a wireless mesh network of beacon devices, comprising:

a storage device; and a processor communicatively coupled to the storage device, wherein the processor executes application code instructions that are stored in the storage device to cause the system to:

receive, from a plurality of servant beacon devices in a mesh network, survey data comprising, for each of the servant beacon devices, a beacon device identifier and received signal strength indicator ("RSSI") of proximate servant beacon devices detected by each servant beacon device;

transmit, to each of the plurality of servant beacon devices, enrollment data comprising beacon device identifiers and corresponding RSSI values of proximate beacon devices to servant beacon devices, wherein the enrollment data is based on the received survey data and wherein the enrollment data may be retransmitted by servant beacon devices within the mesh network to reach other recipient servant beacon devices;

receive authentication data from a plurality of servant beacon devices in a mesh network, the authentication data comprising beacon device identifiers for servant beacon devices and RSSI values detected by servant beacon devices of proximate servant beacon devices;

compare RSSI data from the received survey data packets to the RSSI data from the received authentication data packets;

determine that the mesh network is insecure based on identified differences between the RSSI data from the received survey data packets and the RSSI data from the received authentication data packets.

18. The system of claim 17, wherein the processor is further configured to execute computer-readable program instructions stored in the storage medium to cause the system to:
- determine that the mesh network is secure based on finding no significant differences between the RSSI data from the received survey data packets and the RSSI from the received authentication data packets; and
- transmit, to a user computing device, a notification that the mesh network is secure, wherein the user computing device establishes a network connection with one or more of the beacon devices in the mesh network and wherein the user computing device initiates a transaction with a merchant system associated with the mesh network upon receiving the notification that the mesh network is secure.

19. The system of claim 17, wherein one or more of the servant beacon devices in the mesh network comprise an accelerometer, wherein each of the servant beacon devices comprising an accelerometer, at a time before transmitting authentication data, determine any movement of the servant beacon device, wherein each of the servant beacon devices comprising an accelerometer transmits authentication data that further comprises a movement notification comprising the movement determination, and wherein determining that the network is insecure is further based on receipt of a movement notification indicating that one or more of the servant beacon devices has been moved.

20. The system of claim 17, wherein instead of the RSSI, the path loss, the received channel power indicator, the time of arrival, or the round trip time is detected.

* * * * *